(12) United States Patent
Takahashi et al.

(10) Patent No.: US 8,524,325 B2
(45) Date of Patent: Sep. 3, 2013

(54) METHOD FOR PRODUCING PHOTOCATALYTIC COATING MATERIAL

(75) Inventors: Kazuo Takahashi, Fukuoka (JP); Akira Shimai, Fukuoka (JP); Mitsuhide Shimohigoshi, Fukuoka (JP); Norio Sendoda, Fukuoka (JP); Tatsuhiko Kuga, Fukuoka (JP); Koji Okubo, Fukuoka (JP); Kazumasa Okita, Tokyo (JP)

(73) Assignees: Toto Ltd., Fukuoka (JP); JHCC Ltd., Tokyo (JP); Okitsumo Incorporated, Mie (JP)

( * ) Notice: Subject to any disclaimer, the term of this patent is extended or adjusted under 35 U.S.C. 154(b) by 102 days.

(21) Appl. No.: 12/387,981

(22) Filed: May 11, 2009

(65) Prior Publication Data

US 2009/0226620 A1 Sep. 10, 2009

Related U.S. Application Data

(62) Division of application No. 10/516,021, filed as application No. PCT/JP03/06854 on May 30, 2003, now Pat. No. 7,572,486.

(30) Foreign Application Priority Data

| May 30, 2002 | (JP) | 2002-157654 |
| May 30, 2002 | (JP) | 2002-157655 |
| May 30, 2002 | (JP) | 2002-157656 |

(51) Int. Cl.
*B05D 3/02* (2006.01)
(52) U.S. Cl.
USPC .......................................................... 427/384
(58) Field of Classification Search
USPC .......................................................... 427/384
See application file for complete search history.

(56) References Cited

U.S. PATENT DOCUMENTS

| 6,191,062 B1 | 2/2001 | Hayakawa et al. |
| 6,407,033 B1 | 6/2002 | Kimura et al. |

(Continued)

FOREIGN PATENT DOCUMENTS

| JP | 09-157549 A | 6/1997 |
| JP | 09-234375 A | 9/1997 |

(Continued)

OTHER PUBLICATIONS

Journal of Structural and Construction Engineering, UDC 624/69(043), No. 404 1989-10, pp. 15-24.

(Continued)

*Primary Examiner* — Dah-Wei Yuan
*Assistant Examiner* — Andrew Bowman
(74) *Attorney, Agent, or Firm* — Carrier Blackman & Associates, P.C.; Joseph P. Carrier; William D. Blackman

(57) ABSTRACT

A method of producing a photocatalytic coating material which includes: the steps of coating the surface of a base material having hydrophobic substances on its surface with a photocatalytic coating material including at least (a) photocatalytic oxide particles, (b) a hydrophobic-resin emulsion, (c) water, and (d) silica particles, and hardening the coated material. The average sizes of the ingredient (a) and the ingredient (d) are smaller than that of the emulsified particles of the hydrophobic resin dispersed in the ingredient (b), ingredient (a) constitutes 1 to <5% by weight of the total solid matter of the coating material, ingredient (d) constitutes 1 to 90% by weight of a total solid matter of the coating material, and once the coating material is applied onto a base material, the photocatalytic oxide particles and the silica particles move upward and a coating film 1 μm to 1 mm thick is formed.

18 Claims, 3 Drawing Sheets

(56) References Cited

U.S. PATENT DOCUMENTS

| | | |
|---|---|---|
| 6,906,001 B1 | 6/2005 | Escaffre et al. |
| 2003/0008944 A1 | 1/2003 | Jones et al. |

FOREIGN PATENT DOCUMENTS

| | | | |
|---|---|---|---|
| JP | 09-249871 A | 9/1997 | |
| JP | 10-195333 A | 7/1998 | |
| JP | 10-195369 A | 7/1998 | |
| JP | 10-237354 A | 9/1998 | |
| JP | 10-251565 A | 9/1998 | |
| JP | 10-279886 A | 10/1998 | |
| JP | 10-316937 | 12/1998 | |
| JP | 11-001659 | 1/1999 | |
| JP | 11-100543 A | 4/1999 | |
| JP | 11-140433 A | 5/1999 | |
| JP | 2001-064583 | 3/2001 | |
| JP | 2001-064583 A | * | 3/2001 |
| JP | 2002-69376 A | 3/2002 | |
| JP | 2002-510717 T | 4/2002 | |
| WO | WO 98/03607 A1 | 1/1998 | |
| WO | WO 99/51345 A1 | 10/1999 | |

OTHER PUBLICATIONS

Kobunshi High Polymers, Japan The Society of Polymer Science, Vo., 44 May 1995, p. 307.

Newspaper, Japan Chemical Week, Jan. 30, 1995.

* cited by examiner

METHOD FOR PRODUCING PHOTOCATALYTIC COATING MATERIAL

CROSS-REFERENCE TO RELATED APPLICATIONS

The present application is a divisional of U.S. application Ser. No. 10/516,021, filed 30 Jun. 2005, which is the U.S. National phase of, and claims priority based on PCT/JP2003/06854, filed 30 May 2003, which, in turn, claims priority from Japanese patent applications 2002-157654, 2002-157655, and 2002-157656, all filed 30 May 2002. The entire disclosure of each of the referenced priority documents is incorporated herein by reference.

TECHNICAL FIELD

This invention relates to a photocatalytic coating material, a photocatalytic composite material and a method for producing the same, and a coating which is applied to building exterior surface and exhibits self-cleaning properties.

BACKGROUND ART

In recent years, photocatalytic materials have gained considerable attention as materials which are hydrophilized by their exposure to sunlight and perform a self-cleaning function with the aid of rainfall when applied to building exterior surface. They have also gained attention as environmentally friendly materials which decompose toxic gases such as NOx.

For example, Japanese Patent Laid-Open No. 10-195333 discloses that a coating film capable of decomposing NOx is formed by applying a coating containing water-soluble silicate, a hardening agent and photocatalytic powder (titanium dioxide or zinc oxide) onto the surface of tunnel wall or guardrail and heat-treating the same.

Japanese Patent Laid-Open No. 10-237354 discloses that a building material superior in self-cleaning properties is obtained by applying a coating containing lithium silicate and titanium dioxide onto a building material and heat-treating the same.

In recent years, there has been an increasing tendency to use a water-based coating rather than a solvent base coating from the viewpoint of work environment, effect on surroundings and odor. As a result, water base photocatalytic coating materials to be applied on building exteriors etc. as described above have also been proposed.

For example, Japanese Patent Laid-Open No. 10-195369 discloses a coating composition which is obtained by blending a photocatalyst and a perfluorocopolymer in the emulsion state.

Japanese Patent Laid-Open No. 10-279886 proposes a coating composition which is a silicone emulsion containing a photocatalyst and a fluoro group.

Further, in the fields of building construction and coating, dirt and stains on building exteriors, outdoor structures and the coating film thereon have been posing problems with the increasing environmental pollution. Dust and particulate matter suspended in the air accumulate on the roofs and exterior walls of buildings in fine weather. The accumulations are washed away by rainwater when it rains and flow down the exterior walls of buildings. Further, airborne soot and dust are carried by rain water in rainy weather and flow down the exterior walls of buildings and the surface of outdoor structures. As a result, contaminants are attached on the surface of the exterior walls and that of the structures along the routes rain waters have taken. Once the surfaces are dried, there appears dirt in stripes on the surfaces.

Dirt and stains on building external facings or building coating films are made up of contaminants of: combustion products such as carbon black, urban soot and dust, and inorganic matter such as clay particles. Such diversity of contaminants makes contamination preventive measures complicated (Kitsutaka, Y. "Accelerated Test Method for Contamination of Exterior Wall Coating," Transactions of Structural Division, Architectural Institute of Japan, No. 404, October 1989, 15-24).

Previously, an idea was generally accepted that water-repellent coatings such as polytetrafluoroethylene (PTFE) were preferably used to prevent dirt and stains on building exteriors etc. as described above. In recent years, however, an idea has been generally accepted that the surface of coating films on building exteriors etc. should be as hydrophilic as possible so as to prevent accumulation of dirt of urban soot and dust, which contain a lot of hydrophobic components (Macromolecule, Vol. 44, May, 1995, 307). In such circumstances, a proposal has been made that building exteriors should be coated with a hydrophilic graft polymer (Newspaper, "Japan Chemical Week," Jan. 30, 1995). According to the newspaper's report, the coating film of the hydrophilic graft polymer exhibits such hydrophilic nature that the contact angle of water on the coating film is 30 to 40°. However, the contact angle between inorganic dust, typified by a clayey mineral, and water is 20° to 50°, and such inorganic dust has an affinity for the graft polymer on which contact angle of water is 30 to 40° and is likely to attach on the surface of the graft polymer. Thus, the coating film of such graft polymer is not capable of preventing the dirt and stains of inorganic dust. In the mean time, a variety of hydrophilic coatings have been sold which are composed of acrylic resin, silicone-acrylic resin, water base silicone, block copolymer of silicone resin and acrylic resin, acrylic-styrene resin, sorbitan fatty acid ethylene oxide, sorbitan fatty acid ester, urethane base acetate, cross-linked urethane of polycarbonate diol and/or polyisocyanate, or polyacrylic alkyl ester. The contact angle between each of the above hydrophilic coatings and water is 50 to 70° at the most, and such coatings are not capable of effectively preventing the dirt and stains of urban soot and dust, which contain a lot of lipophilic components.

As means for resolving the above described problems, coating compositions containing a photocatalyst have been proposed. Photocatalyst-containing coating films are capable of making their surface hydrophilic when exposed to UV rays from outdoor light and keeping the contact angle of water on them 20° or less. Further, they have the effect of both inhibiting the propagation of molds and algae and removing toxic substances such as NOx and SOx.

Examples of coating compositions that contain a photocatalyst are those disclosed in: 1. WO 98/03607, 2. Japanese Patent Laid-Open No. 11-1659, 3. Japanese Patent Laid-Open No. 2002-69376 and 4. Japanese Patent Laid-Open No. 10-316937.

WO 98/03607 discloses a composition including: photocatalytic particles composed of metallic oxide; at least one selected from the group consisting of silica fine particles, a silicone resin film precursor capable of forming a silicone resin film and a silica film precursor capable of forming a silica film; and a solvent, wherein the concentration of the total amount of the above photocatalytic particles plus the above silica fine particles or precursor, in terms of silica weight, in the composition is 0.01 to 5% by weight. In the examples described in the above specification, tetrafunctional silane was used as the silicone resin film precursor capable of forming a silicone resin film. The specification states that to prevent the film from becoming opaque white due to irregular reflection of light and allow the same to be substantially transparent, the thickness of the film is preferably 0.4 μm or less. Further, in examples described in the specification, alcohol having high power of dissolving organic resins, such as methanol or propanol, was used together with water so as to dissolve tetrafunctional silane.

Japanese Patent Laid-Open No. 11-1659 discloses a coating composition which is obtained by dispersing a photocatalyst in fluorine resin and silica (or the precursor thereof) or silicone (or the precursor thereof). In the examples described in the specification, solvent base fluorine resin and solvent base silicone resin were used so as to produce a highly durable coating. Solvent base coatings are superior in weathering performance; however, when they are applied to an organic base which is susceptible to attack by solvents, such as emulsion paint, their weatherability may possibly deteriorate (troubles such as peeling and cracking may possibly occur) after application. In the examples described in the specification, the coating film was dried at 120° C., so the hardening conditions after coating may also affect the durability of the coating film in this technique.

Japanese Patent Laid-Open No. 2002-69376 discloses a self-cleaning coating composition which is obtained by mixing photocatalytic particles or the sol thereof into trifunctional silicone resin and/or trifunctional silicone resin precursor capable of forming a silicone resin film and a whisker (or mica, talc) and which provides a film such that the contact angle of water on its surface is decreased to 20° or less when it is exposed to light.

Japanese Patent Laid-Open No. 10-316937 discloses a coating composition which is obtained by dispersing photocatalytic particles in water base silicone emulsion resin containing a surfactant so that the photocatalytic particles constitute 5% by weight or more of the composition. The specification states that the composition can be applied directly onto plates whose surface has a coat of organic paint. And in the examples described in the specification, direct application of the composition onto such plates was performed and evaluated.

The water-based coatings disclosed in Japanese Patent Laid-Open Nos. 10-195333 and 10-237354 have poor wettability to base materials having hydrophobic substances on their surface, such as plastics and painted steel, and therefore their applications are limited to glass, wood and metals.

The water-based coatings disclosed in Japanese Patent Laid-Open Nos. 10-195369 and 10-279886 have improved wettability to base materials having hydrophobic substances on their surface, such as plastics and painted steel; however, assuming that they are used outdoors, the contact angle of water on them right after their application is still too large. As a result, they could not perform their self-cleaning function with the aid of rainfall right after their application.

From the viewpoints of environmental burden, consideration for and safety of builders or a building site and its vicinity, replacing solvent base coatings by water base ones is the problem which we have to face.

Self-cleaning coatings for use in exterior walls are required to have good weatherability. To enhance the weatherability of a coating, particularly of a coating containing a photocatalyst, the thickness of the coating film has to be increased to such an extent that radicals generated from the photocatalyst by exposing the coating film to ultraviolet rays do not reach the layer underlying the coating film (several μm or more) and thereby protect the underlying layer from the activity of the photocatalyst. But on the other hand, with the increase in thickness of the coating film, cracks are more likely to occur on the film surface. Thus, how to make weatherability and prevention of cracking be compatible with each other is a problem with self-cleaning coatings containing a photocatalyst.

In repainting existing walls, organic primers are often used. These primers are composed of acrylic emulsion and therefore susceptible to attack by strong solvents. Accordingly, when intending to apply a coating directly onto such organic bases, a water-based coating is desirably used.

As aforementioned, WO 98/03607 discloses a coating composition in which tetrafunctional silane is mainly used as a silicone resin film precursor. However, when a film containing tetrafunctional silane is formed to thickness of several μm so as to impart the film with weatherability, cracks are likely to occur in the film.

Further, when the above coating composition is applied directly onto an organic base, the alcohol solvent attacks the organic base because of its high solvency power against resin, which may cause cracks or peeling of the film right after the application of the coating composition.

The inventors of this invention proposed in Japanese Patent Laid-Open No. 2002-69376 a photocatalytic coating composition which includes a blend of: a trifunctional silicone resin and/or a trifunctional silicone resin precursor capable of forming a silicone resin film; and whisker so as to provide a self-cleaning coating composition that has both weatherability and difficulty in causing cracks, but they could not make the composition a water base one. Further, the coating composition disclosed in Japanese Patent Laid-Open No. 2002-69376 was so hard that it needed an appropriate intercoat when applied to an organic material to be coated.

In the examples described in Japanese Patent Laid-Open No. 10-316937, coating films of 1 and 20 μm were formed on the respective plate whose surface has a coat of organic paint and the adhesion etc. of each coating film was evaluated. The evaluation showed that the adhesion was not sufficient for the coating film 20 μm thick directly applied onto the plate whose surface has a coat of organic paint. The specification did not disclose any data on the films' weatherability.

No prior art has disclosed a photocatalyst-containing and stain-proofing performance-exhibiting water-based coating composition that provides a coating film not only having good adhesion to organic materials as objects to be coated even when its coating is performed at ordinary temperature, but also having good weathering performance.

As described above, there has been no water base photocatalytic coating composition that has good adhesion to a substrate, does not cause cracks when used outdoors and has good weathering performance, even when it is formed into a film having a thickness sufficient to intercept ultraviolet light.

This invention has been made in the light of the above described circumstances. Accordingly, an object of this invention is to provide: a photocatalytic coating material which poses no problem in terms of work environment, effect on surroundings and odor, which can be applied onto base materials having hydrophobic substances on their surface, such as plastics and painted steel, and which allows, when it is formed into a film on base materials having hydrophobic substances on their surface, the formed film to have firm adhesion to the base materials, allows the contact angle of water on the surface of the film to be small even immediately after the application of the composition, and hence the film to perform its self-cleaning function with the aid of rainfall right after its use, and also allows the above described state of the film to be kept for a long time by exposing the film to sunlight; a photocatalytic composite material formed by applying the above photocatalytic coating material onto a base material having a hydrophobic substance on its surface; and a method for producing the same.

Another object of this invention is to provide a photocatalyst-containing and stain-proofing performance-exhibiting water-based coating composition that provides a coating film not only having good adhesion to organic materials as objects to be coated even when its coating is performed at ordinary temperature, but also having good weathering performance and therefore causing no cracks when used outdoors.

SUMMARY OF THE INVENTION

To resolve the above described problems, this invention is intended to provide a photocatalytic coating material which includes: at least (a) photocatalytic oxide particles, (b) a hydrophobic-resin emulsion, and (c) water, characterized in that the average particle size of the above photocatalytic oxide particles is smaller than that of the particles dispersed in the above hydrophobic-resin emulsion.

The composition as described above makes it possible to provide a photocatalytic coating material which poses no problem in terms of work environment, effect on surroundings and odor, and which allows, when it is formed into a film on base materials having hydrophobic substances on their surface, the formed film to have firm adhesion to the base materials, allows the contact angle of water on the surface of the film to be small even immediately after the application of the composition, and hence the film to perform its self-cleaning function with the aid of rainfall right after its use, and also allows the above described state of the film to be kept for a long time by exposing the film to sunlight.

When the above described photocatalytic coating material is applied onto a base material having hydrophobic substances on its surface, the photocatalytic oxide particles, whose particle size is relatively small, move upward. This allows the contact angle of water on the surface of the coating film to be small even right after the application of the coating material, and hence the film to perform its self-cleaning function with the aid of rainfall right after its use and also allows the above described state of the film to be kept for a long time by exposing the film to sunlight. Meanwhile, the particles dispersed in the hydrophobic-resin emulsion, whose particle size is relatively large, move downward, which enhances the adhesion of the coating film to the base material having hydrophobic substances on its surface.

In a preferred embodiment of this invention provided is a photocatalytic coating material which includes: at least (a) photocatalytic oxide particles, (b) a hydrophobic-resin emulsion, (c) water and (d) silica particles, characterized in that the average particle size of the above photocatalytic oxide particles and silica particles is smaller than that of the particles dispersed in the above hydrophobic-resin emulsion.

Addition of silica particles allows the contact angle of water on the surface of the coating film to be much smaller even immediately after the application of the coating material, and hence the film to perform its self-cleaning function with the aid of rainfall more easily right after its use.

When the above described photocatalytic coating material is applied onto a base material having hydrophobic substances on its surface, the photocatalytic oxide particles and silica particles, whose particle size is relatively small, move upward. This allows the contact angle of water on the surface of the coating film to be small even right after the application of the coating material, and hence the film to perform its self-cleaning function with the aid of rainfall right after its use and also allows the above described state of the film to be kept for a long time by exposing the film to sunlight. Meanwhile, the particles dispersed in the hydrophobic-resin emulsion, whose particle size is relatively large, move downward, which enhances the adhesion of the coating film to the base material having hydrophobic substances on its surface.

In a preferred embodiment of this invention, the average particle size of the above described photocatalytic oxide particles is set to fall in the range of 5 to 50 nm and that of the above described particles dispersed in the hydrophobic-resin emulsion in the range of 80 to 300 nm.

If the average particle size of the photocatalytic oxide particles is 5 nm or more, photocatalytic reaction utilizing the irradiation of sunlight is fully developed and the hydrophilic nature of the film surface is more likely to be maintained for a long time. Further, so high a degree of hydrophilic state that the contact angle of water on the film is 10° or less is more likely to be maintained.

Meanwhile, if the average particle size of the photocatalytic oxide particles is less than 50 nm and that of the particles dispersed in the hydrophobic-resin emulsion is 80 nm or more, the difference in particle size between the photocatalytic oxide particles and the particles dispersed in the hydrophobic-resin emulsion becomes large enough to make the photocatalytic oxide particles, whose particle size is relatively small, more likely to move upward and the particles dispersed in the hydrophobic-resin emulsion, whose particle size is relatively large, more likely to move downward. This allows the contact angle of water on the coating film surface to be small even immediately after the application of the coating material, and hence the coating film to perform its self-cleaning function right after its use. This also allows the above described state of the coating film to be kept for a long time by exposing the film to sunlight, and besides, enhances the adhesion of the film to the base material having hydrophobic substances on its surface.

If the average particle size of the particles dispersed in the hydrophobic-resin emulsion is 300 nm or more, the stability of the emulsion deteriorates and the viscosity of the same is increased, which makes the coating material impossible to use as a coating composition.

In a preferred embodiment of this invention, the average particle size of the above described photocatalytic oxide particles is 5 to 50 nm, that of the above described silica particles 5 to 100 nm and preferably 5 to 50 nm, and that of the above described particles dispersed in the hydrophobic-resin emulsion 80 to 300 nm and preferably 100 to 300 nm.

If the average particle size of the silica particles is less than 5 nm, the bond strength among the silica particles is increased and the particles are likely to agglomerate.

If the average particle size of the photocatalytic oxide particles is less than 50 nm, that of the silica particles less than 100 nm and preferably less than 50 nm, and that of the particles dispersed in the hydrophobic-resin emulsion 80 nm or more and preferably 100 nm or more, the difference in particle size between the photocatalytic oxide particles and silica particles and the particles dispersed in the hydrophobic-resin emulsion becomes large enough to make the photocatalytic oxide particles and silica particles, whose particle size is relatively small, more likely to move upward and the particles dispersed in the hydrophobic-resin emulsion, whose particle size is relatively large, more likely to move downward. This allows the contact angle of water on the coating film surface to be small even immediately after the application of the coating material, and hence the coating film to perform its self-cleaning function right after its use. This also allows the above described state of the coating film to be kept for a long time by exposing the film to sunlight, and besides, enhances the adhesion of the film to the base material having hydrophobic substances on its surface.

In a preferred embodiment of this invention, the photocatalytic oxide particles constitute 1 to 20% by weight and preferably 1 to 5% by weight of the total solid matter of the coating material, the hydrophobic-resin emulsion 5 to 99% by weight and preferably 10 to 99% by weight, and the amount of the water blended is 10 to 500 parts by weight and preferably 10 to 109 parts by weight per 100 parts of the solid matter.

Setting the amount of the water blended to be 10 to 500 parts by weight and preferably 10 to 109 parts by weight per 100 parts of solid matter allows the coating material to form a coating film of appropriate thickness, 1 μm to 1 mm thickness.

Setting the percentage of the photocatalytic oxide particles in the solid matter to be 1% by weight or more allows the contact angle of water on the coating film surface to be small, and hence the coating film to perform its self-cleaning function right after its use and also allows the above state of the coating film to be kept for a long time with the aid of sunlight irradiation.

Setting the percentage of the photocatalytic oxide particles in the solid matter to be 20% by weight or less and preferably 5% by weight or less makes it possible to avoid the effect on the binder which the hydrophobic-resin emulsion exerts when it is hardened by the decomposition power of the photocatalytic oxide based on the oxidation-reduction power of the same and therefore to keep the self-cleaning function of the coating film for a long time when the coating film is used outdoors.

Further, setting the percentage of the hydrophobic-resin emulsion in the solid matter to be 5% by weight or more and preferably 10% by weight or more enhances the adhesion of the coating film to base materials having hydrophobic substances on their surface.

In a preferred embodiment of this invention, the photocatalytic oxide particles constitute 1 to 20% by weight and preferably 1 to 5% by weight of the total solid matter of the coating material, the silica particles 1 to 90% by weight, the hydrophobic-resin emulsion 5 to 98% by weight and preferably 10 to 98% by weight, and the amount of the water blended is 10 to 500 parts by weight and preferably 10 to 108 parts by weight per 100 parts of the solid matter.

Setting the percentage of the silica particles in the solid matter to be 1% by weight or more allows the contact angle of water on the coating film to be much smaller even immediately after the application of the coating material, and hence the coating film to perform its self-cleaning performance with the aid of rainfall right after its use and also allows such a state of the coating film to be kept for a long time with the aid of sunlight irradiation.

In a preferred embodiment of this invention provided is a photocatalytic coating material which includes: at least (a) photocatalytic oxide particles, (b) a hydrophobic-resin emulsion and (c) water, characterized in that the above photocatalytic oxide particles constitute 1 to 5% by weight of the total solid matter of the coating material.

Setting the percentage of the photocatalytic oxide particles in the total solid matter to be 5% by weight or less makes it possible to avoid the effect on the bond strength between the binder and the photocatalytic oxide particles and between the coating film and base materials which the hydrophobic-resin emulsion exerts when it is hardened by the decomposition power of the photocatalytic oxide based on the oxidation-reduction power of the same and therefore to keep the strength of the coating film as well as the adhesion of the same to base materials for a long time when the coating film is used outdoors.

In a preferred embodiment of this invention provided is a photocatalytic coating material which includes: at least (a) photocatalytic oxide particles, (b) a hydrophobic-resin emulsion, (c) water and (d) silica particles, characterized in that the above photocatalytic oxide particles constitute 1 to 5% by weight of the total solid matter of the coating material.

Setting the percentage of the photocatalytic oxide particles in the total solid matter to be 5% by weight or less makes it possible to avoid the effect on the bond strength among the binder, the photocatalytic oxide particles and the silica particles and between the coating film and base materials which the hydrophobic-resin emulsion exerts when it is hardened by the decomposition power of the photocatalytic oxide based on the oxidation-reduction power of the same and therefore to keep the strength of the coating film as well as the adhesion of the same to base materials for a long time when the coating film is used outdoors.

In a preferred embodiment of this invention, the above described hydrophobic-resin emulsion is one or more selected from the group consisting of a fluorine-resin emulsion and a silicone emulsion.

The use of a fluorine-resin emulsion and/or a silicone emulsion provides the coating film with good weatherability.

To resolve the above described problems, this invention is also intended to provide a self-cleaning water-base coating composition which provides a coating film such that the contact angle of water on the surface of the coating film is decreased to 20° or less with the aid of light irradiation; specifically, the composition includes the following ingredients (a), (b) and (c):
  (a) a silicone resin precursor composed of a water-based emulsion capable of forming a silicone resin film and/or a water-based emulsion capable of forming a fluorine resin and/or colloidal silica,
  (b) photocatalytic particles or photocatalytic sol, and
  (c) water,
wherein the ingredient (b) constitutes less than 5% by weight of the total solid matter of the coating composition.

Preferably the self-cleaning water-base coating composition of this invention contains an inorganic coloring pigment.

Preferably the self-cleaning water-base coating composition of this invention contains an inorganic extender pigment.

Preferably the above inorganic extender pigment is whisker, mica or talc.

Preferably the solid content in the above self-cleaning water-base coating composition is 10% or more.

Preferably the coating film formed of the above self-cleaning water-base coating composition is 5 μm or more thick.

The above self-cleaning water-base coating composition can be coated directly onto an organic ground and hardened at ordinary temperature.

To resolve the above described problems, this invention is also intended to provide a self-cleaning water-base coating composition which provides a coating film such that the contact angle of water on the film surface is decreased to 20° or less with the aid of light irradiation; specifically, the composition includes the following ingredients (a), (b), (c), (d) and (e):
  (a) a silicone resin precursor composed of a water-based emulsion capable of forming a silicone resin film and/or a water-based emulsion capable of forming a fluorine resin,
  (b) at least one selected from the group consisting of whisker, mica and talc, (c) photocatalytic particles,
(d) an inorganic coloring pigment, and
(e) water.

DETAILED DESCRIPTION INCLUDING BEST MODE FOR CARRYING OUT THE INVENTION

Figure 1:
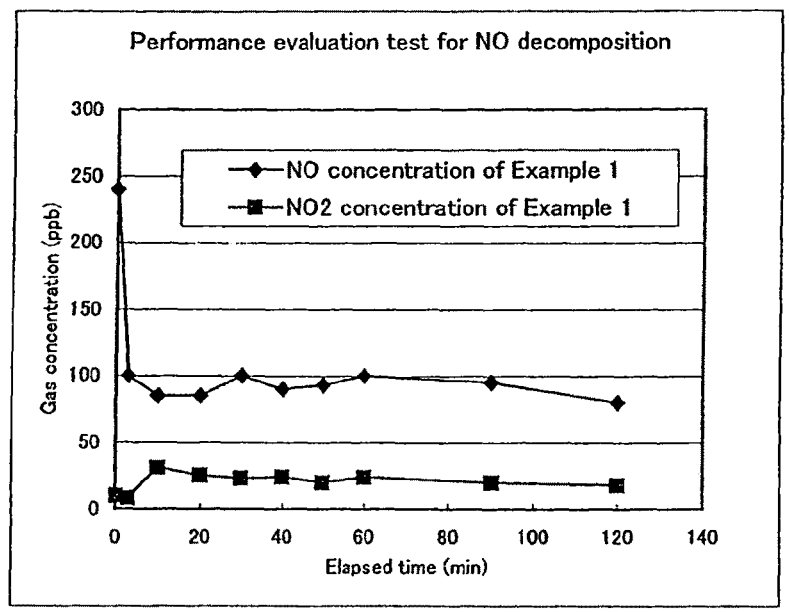
FIG. 1 is a graph showing the nitrogen monoxide decomposition performance of a coating composition in accordance with one example of this invention.
Figure 2:
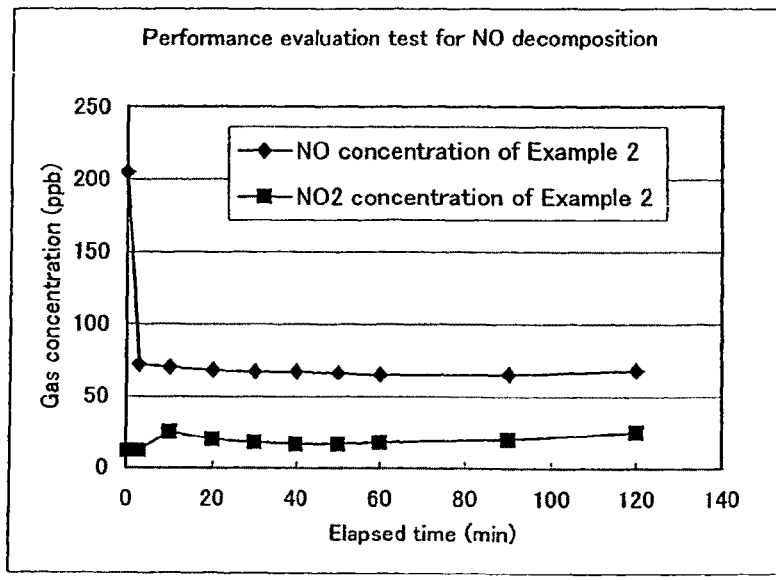
FIG. 2 is a graph showing the nitrogen monoxide decomposition performance of a coating composition in accordance with another example of this invention.
Figure 3:
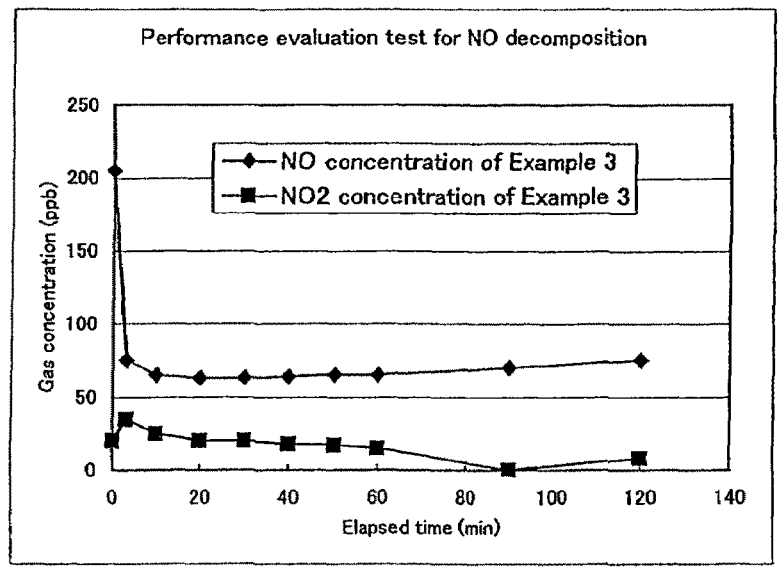
FIG. 3 is a graph showing the nitrogen monoxide decomposition performance of a coating composition in accordance with still another example of this invention.
Figure 4:
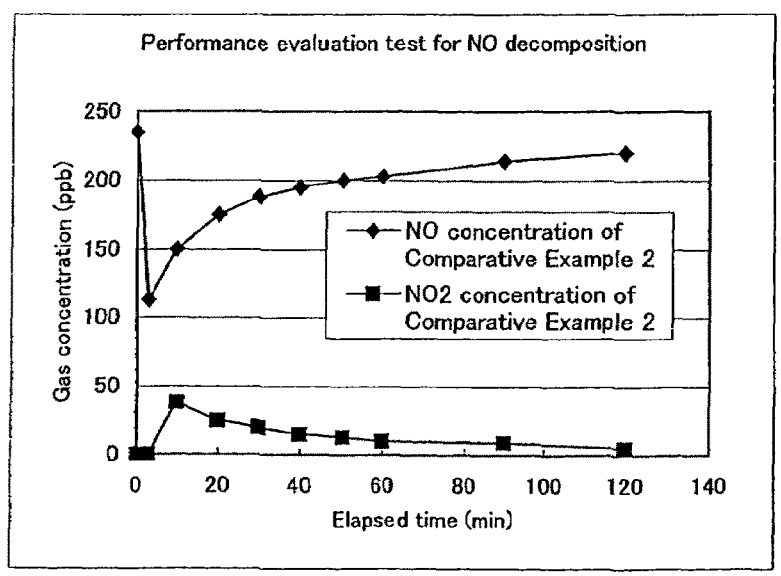
FIG. 4 is a graph showing the nitrogen monoxide decomposition performance of a coating composition in accordance with a comparative example.
Figure 5:
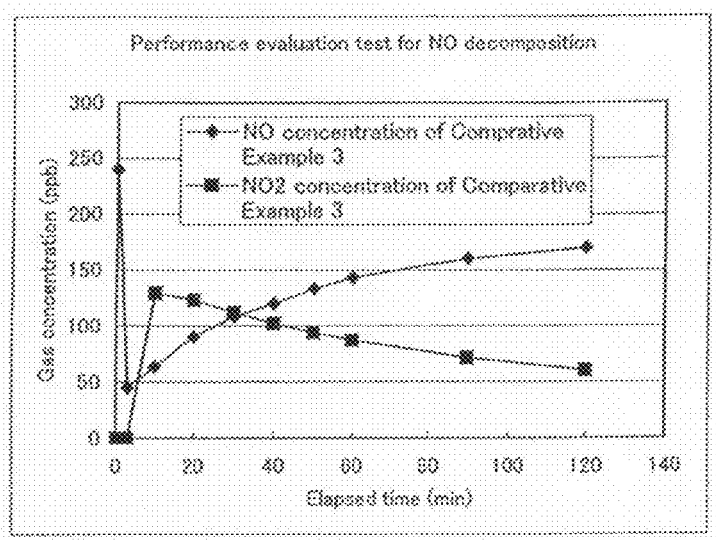
FIG. 5 is a graph showing the nitrogen monoxide decomposition performance of a coating composition in accordance with another comparative example.

In the following this invention will be described in terms of its preferred embodiments.

First, terms used in this invention will be described.

In this invention, as the ingredient expressed by the term "photocatalytic oxide particles", particles of, for example, titanium oxide, zinc oxide, tin oxide, iron oxide, zirconium oxide, tungsten oxide, chromium oxide, molybdenum oxide, ruthenium oxide, germanium oxide, lead oxide, cadmium oxide, copper oxide, vanadium oxide, niobium oxide, tantalum oxide, manganese oxide, rhodium oxide, nickel oxide, rhenium oxide and strontium titanate can be used.

When using titanium oxide as a photocatalyst, it is preferable to use anatase type or brookite type titanium oxide, because photocatalytic activity is the strongest and lasts for a long time in such types of titanium oxide.

As the ingredient expressed by the term "hydrophobic-resin emulsion", can be used emulsions of, for example, fluorine resin, silicone, acrylic silicone, vinyl acetate acryl, acrylic urethane, acryl, epoxy, vinyl chloride vinyl acetate, vinylidene chloride and SBR latex.

Examples of fluorine resin emulsions suitably used are emulsions of polymer having a fluoro group, such as polytetrafluoroethylene, poly(vinylidene fluoride), poly(vinyl fluoride), polychlorotrifluoroethylene, tetrafluoroethylene-hexafluoropropylene copolymer, ethylene-tetrafluoroethylene copolymer, ethylene-chlorotrifluoroethylene copolymer, tetrafluoroethylene-perfluoroalkylvinylether copolymer, perfluorocyclo polymer, vinylether-fluoroolefin copolymer, vinylester-fluoroolefin copolymer, tetrafluoroethylene-vinylether copolymer, chlorotrifluoroethylene-vinylether copolymer, tetrafluoroethylene urethane crosslinked polymer, tetrafluoroethylene epoxy crosslinked polymer, tetrafluoroethylene acryl crosslinked polymer and tetrafluoroethylene melamine crosslinked polymer.

Examples of silicone emulsions suitably used are emulsions of hydrolysis or dehydration condensation polymers of, for example, methyltrimethoxysilane, methyltriethoxysilane, methyltrichlorosilane, methyltribromosilane, methyltriisopropoxysilane, methyltri-t-butoxysilane, ethyltrimethoxysilane, ethyltriethoxysilane, ethyltrichlorosilane, ethyltribromosilane, ethyltriisopropoxysilane, ethyltri-t-butoxysilane, n-propyltrimethoxysilane, n-propyltriethoxysilane, n-propyltrichlorosilane, n-propyltribromosilane, n-propyltriimethoxysilane, n-hexyltriethoxysilane, n-hexyltrichlorosilane, n-hexyltribromosilane, n-hexyltriisopropoxysilane, n-hexyltri-t-butoxysilane, n-decyltrimethoxysilane, n-decyltriethoxysilane, n-decyltrichlorosilane, n-decyltribromosilane, n-decyltriisopropoxysilane, n-decyltri-t-butoxysilane, n-octatrimethoxysilane, n-octatriethoxysilane, n-octatrichlorosilane, n-octatribromosilane, n-octatriisopropoxysilane, n-octatri-t-butoxysilane, phenyltrimethoxysilane, phenyltriethoxysilane, phenyltrichlorosilane, phenyltribromosilane, phenyltriisopropoxysilane, phenyltri-t-butoxysilane, dimethyldichlorosilane, dimethyldibromosilane, dimethyldimethoxysilane, dimethyldiethoxysilane, diphenyldichlorosilane, diphenyldibromosilane, diphenyldimethoxysilane, diphenyldiethoxysilane, phenylmethyldichlorosilane, phenylmethyldibromosilane, phenylmethyldimethoxysilane, phenylmethyldiethoxysilane, vinyltrichlorosilane, vinyltribromosilane, vinyltrimethoxysilane, vinyltriethoxysilane, vinyltriisopropoxysilane, vinyltri-t-butoxysilane, trifluoropropyltrichlorosilane, trifluoropropyltritidibromsilane, trifluoropropyltrimethoxysilane, trifluoropropyltriethoxysilane, vinyltrichlorosilane, trifluoropropyltriisopropoxysilane, trifluoropropyltri-t-butoxysilane, γ-glycidoxypropylmethyldimethoxysilane, γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyltri-t-butoxysilane, γ-methacryloxypropylmethyldimethoxysilane, γ-methacryloxypropylmethyldiethoxysilane, γ-methacryloxypropyltrimethoxysilane, γ-methacryloxypropyltriethoxysilane, γ-methacryloxypropyltriisopropoxysilane, γ-methacryloxypropyltri-t-butoxysilane, γ-aminopropylmethyldimethoxysilane, γ-aminopropylmethyldiethoxysilane, γ-aminopropyltrimethoxysilane, γ-aminopropyltriethoxysilane, γ-aminopropyltriisopropoxysilane, γ-aminomethacryloxypropyltri-t-butoxysilane, γ-methylcaptopropylmethyldimethoxysilane, γ-methylcaptopropylmethyldiethoxysilane, γ-methylcaptopropyltrimethoxysilane, γ-methylcaptopropyltriethoxysilane, γ-methylcaptopropyltriisopropoxysilane, γ-methylcaptopropyltri-t-butoxysilane, β-(3,4-epoxycyclohexyl)ethyltrimethoxysilane and β-(3,4-epoxycyclohexyl)ethyltriethoxysilane.

A concrete example of preferred "silica particles" is amorphous silica particles. Amorphous silica in the form of colloidal silica is particularly preferable. Colloidal silica is classified into two types: one is silica dispersion in water, and the other is silica dispersion in a nonaqueous organic solvent such as alcohol. Although both types of colloidal silica is applicable, silica dispersion in water is preferably used in this invention because silica dispersion in a nonaqueous organic solvent causes the stability of emulsion, as a constituent of this invention, to deteriorate a little. Colloidal silica as silica dispersion in an organic solvent can be easily prepared by replacing the aqueous solvent of the silica dispersion in water with an organic solvent.

The average particle size of the photocatalytic oxide particles and silica particles and that of the particles dispersed in the hydrophobic-resin emulsion were measured by dynamic light scattering using laser as a light source. The measuring apparatus used was dynamic light scattering spectrophotometer, DLS-600 by OTSUKA ELECTRONICS CO., LTD.

The coating material of this invention can be obtained by, for example, adding colloidal silica, if necessary, and then a hydrophobic-resin emulsion to a sol of photocatalytic oxide particles in water and diluting the mixture with water depending on the situation.

The coating material of this invention can be modified to a photocatalytic composite material, once it is applied onto a base material having hydrophobic substances on its surface and hardened, which can perform its self-cleaning function with the aid of rainfall even right after its use and whose state is kept for a long time with the aid of sunlight irradiation. Carrying out the hardening at ordinary temperature is advantageous to site work and the like.

As a "base material having hydrophobic substances on its surface", suitably used are, for example, plastics, textile of organic matter, cloth of organic matter and painted material such as a painted steel plate.

Preferably a metal such as Ag, Cu or Zn is added to the coating material of this invention. The surface layer of the coating film to which such a metal has been added is capable of killing bacteria, molds or algae attached thereon even in the dark. Thus, the coating film is allowed to have improved stain-proofing performance.

Metals of platinum group such as Pt, Pd, Ru, Rh, Ir and Os can also be added to the coating material of this invention. The surface layer of the coating film to which such a metal has been added is capable of enhancing the oxidation-reduction activity of photocatalyst. Thus, the coating film is allowed to have improved performance of decomposing not only organic dirt, but also noxious gas and bad smell.

To improve the film integrity of the hydrophobic-resin emulsion on a base material, a film integrity assistant can be used in the coating material of this invention. The film integrity assistant remains in the coating film even after most of water content vaporizes and performs the function of promoting the coalescence among emulsion particles. Specifically, film integrity assistants are organic compounds having a boiling point of 100° C. or more. Concrete examples of film integrity assistants include: ethylene-based glycol ethers such as ethylene glycol monomethyl ether, ethylene glycol monoethyl ether, ethylene glycol monobutyl ether, diethylene glycol monopropyl ether, diethylene glycol monobutyl ether, diethylene glycol monohexyl ether, ethylene glycol ethyl ether acetate and diethylene glycol monobutyl ether acetate; propylene-based glycol ethers such as propylene glycol monomethyl ether, propylene glycol monobutyl ether, propylene glycol monopropyl ether, propylene glycol monobutyl ether, dipropylene glycol monomethyl ether, dipropylene glycol dimethyl ether, dipropylene glycol monobutyl ether, tripropylene glycol monomethyl ether, tripropylene glycol monobutyl ether, polypropylene glycol monomethyl ether, propylene glycol monomethyl ether acetate, propylene glycol diacetate and propylene glycol phenyl ether; and esters such as 2,2,4-trimethyl-1,3-pentanediol monoisobutylate, n-pentyl propionate and dibutyl phthalate.

Among the above described film integrity assistants, 2,2,4-trimethyl-1,3-pentanediol monoisobutylate, which is a kind of ester, is preferably used because it has high penetrability into a fluorine resin emulsion and is highly effective in decreasing the minimum film integrity temperature (MFT). On the other hand, ethylene-based glycol ethers are not preferably used because they are highly toxic to the human body.

Coloring materials can also be added to the coating material of this invention. At least one coloring material is selected from the group consisting of inorganic pigments, organic pigments and dyes.

Examples of inorganic pigments include: metal oxides such as titanium oxide, zinc white, red iron oxide, chromium oxide, cobalt blue and black iron oxide; metal hydroxides such as alumina white and yellow oxide; ferrocyanides such as Prussian blue; lead chromates such as chrome yellow, zinc chromate and molybdate red; sulfides such as zinc sulfide, vermilion, cadmium yellow and cadmium red; selenides; sulfates such as barite and precipitated barium sulfate; carbonates such as ground calcium carbonate and precipitated calcium carbonate; silicates such as silicate hydrate, clay and ultramarine; carbons such as carbon black; metal powders such as aluminum powder, bronze powder and zinc powder; and pearl pigments such as titanated mica.

Examples of organic pigments include: nitroso pigments such as naphtol green B; nitro pigments such as naphtol S; azo pigments such as lithol red, lake red C, fast yellow and naphthol red; and condensation polycyclic pigments such as alkali blue red, rhodamine chelate, quinacridone red, dioxazine violet and isoindolinone yellow.

Examples of dyes include: disperse dye, basic dye, direct dye and acid dye.

EXAMPLES

Preparation of Coating Compositions

The solid content in each ingredient and the average particle size of the same used in the preparation of coating compositions of examples and comparative examples are shown in Table 1.

TABLE 1

| | Trade name | Manufacturer | Solid content (%) | Average particle size (nm) |
|---|---|---|---|---|
| Photo-catalytic oxide | PALTITAN 5610 | NIHON PARKERRIZING Co., Ltd. | 4 | 50 |
| | TKS-203 | TAYCA Corporation | 20 | 30 |
| | STS-21 | ISHIHARA SANGYO Co., Ltd. | 38.3 | 30 |
| Silica material | SILICADOL 30B | Nippon Chemical Industrial CO., LTD. | 30 | 10 |
| | Snowtex 50 | Nissan Chemicals Industries, Ltd. | 50 | 20 |
| | Snowtex ZL | Nissan Chemicals Industries, Ltd. | 40 | 100 |
| Emulsion | Lumiflon FE3000 | Asahi Glass Co., Ltd. | 50 | 150 |
| | Lumiflon FE4300 | Asahi Glass Co., Ltd. | 50 | 150 |
| | Lumiflon FE100 | Asahi Glass Co., Ltd. | 50 | — |
| | Boncoat SA-5080 | Dainippon Ink and Chemicals, Incorporated | 50 | 160 |

TABLE 1-continued

|  | Trade name | Manufacturer | Solid content (%) | Average particle size (nm) |
|---|---|---|---|---|
| Pigment | MF5160 | Dainichiseika Color and Chemical Mfg. Co., Ltd. | 60 | — |
|  | Tismo N | Otsuka Chemical Co., Ltd. | 100 | — |
|  | HT-300 | Otsuka Chemical Co., Ltd. | 100 | — |
|  | Micro Ace P3 | Nippon Talc Co., Ltd. | 100 | — |
| Film integrity assistant | Texanol | Eastman Kodak Company | 100 | — |
|  | CS-12 | CHISSO CORPORATION | 100 | — |

Example 1

10.2 parts by weight of photocatalytic oxide sol (PALTITAN 5610, by NIHON PARKERRIZING Co., Ltd.), 79.6 parts by weight of colloidal silica (SILICADOL 30B, by Nippon Chemical Industrial CO., LTD.), 10.2 parts by weight of fluorine resin emulsion (Lumiflon FE3000, by Asahi Glass Co., Ltd.) (so far indicated in terms of solid matter) and 2.1 parts by weight of film integrity assistant (Texanol, by Eastman Kodak Company) were mixed to prepare a water-based coating composition. The amount of water was 433 parts by weight per 100 parts of the total solid matter.

Example 2

20.1 parts by weight of photocatalytic oxide sol (TKS-203, by TAYCA Corporation), 10.2 parts by weight of colloidal silica (Snowtex 50, by Nissan Chemicals Industries, Ltd.), 69.7 parts by weight of fluorine resin emulsion (Lumiflon FE4300, by Asahi Glass Co., Ltd.) (so far indicated in terms of solid matter) and 15.7 parts by weight of film integrity assistant (Texanol, by Eastman Kodak Company) were mixed to prepare a water-based coating composition. The amount of water was 159 parts by weight per 100 parts of the total solid matter.

Example 3

3.2 parts by weight of photocatalytic oxide sol (PALTITAN 5610, by NIHON PARKERRIZING Co., Ltd.), 25.9 parts by weight of colloidal silica (Snowtex 50, by Nissan Chemicals Industries, Ltd.), 3.2 parts by weight of fluorine resin emulsion (Lumiflon FE4300, by Asahi Glass Co., Ltd.), 38.9 parts by weight of coloring pigment (MF Color MF5160, by Dainichiseika Color and Chemical Mfg. Co., Ltd.), 28.8 parts by weight of extender pigment (Tismo N, by Otsuka Chemical Co., Ltd.) (so far indicated in terms of solid matter) and 0.7 parts by weight of film integrity assistant (CS-12, by CHISSO CORPORATION) were mixed to prepare a water-based coating composition. The amount of water was 132 parts by weight per 100 parts of the total solid matter.

Example 4

1 part by weight of photocatalytic oxide sol (STS-21, ISHIHARA SANGYO Co., Ltd.), 38.8 parts by weight of colloidal silica (Snowtex ZL, by Nissan Chemicals Industries, Ltd.), 23.1 parts by weight of fluorine resin emulsion (Lumiflon FE4300, by Asahi Glass Co., Ltd.), 20.4 parts by weight of coloring pigment (MF Color MF5160, by Dainichiseika Color and Chemical Mfg. Co., Ltd.), 4.7 parts by weight of extender pigment (HT-300, by Otsuka Chemical Co., Ltd.), 12.0 parts by weight of extender pigment (Micro Ace P3, by Nippon Talc Co., Ltd.) (so far indicated in terms of solid matter) and 7.8 parts by weight of film integrity assistant (CS-12, by CHISSO CORPORATION) were mixed to prepare a water-based coating composition. The amount of water was 152 parts by weight per 100 parts of the total solid matter.

Example 5

1.4 parts by weight of photocatalytic oxide sol (STS-21, ISHIHARA SANGYO Co., Ltd.), 50.8 parts by weight of colloidal silica (Snowtex ZL, by Nissan Chemicals Industries, Ltd.), 15.0 parts by weight of fluorine resin emulsion (Lumiflon FE4300, by Asahi Glass Co., Ltd.), 26.7 parts by weight of coloring pigment (MF Color MF5160, by Dainichiseika Color and Chemical Mfg. Co., Ltd.), 6.1 parts by weight of extender pigment (HT-300, by Otsuka Chemical Co., Ltd.) (so far indicated in terms of solid matter) and 3.3 parts by weight of film integrity assistant (CS-12, by CHISSO CORPORATION) were mixed to prepare a coating composition. The amount of water was 175 parts by weight per 100 parts of the total solid matter.

Example 6

18.3 parts by weight of photocatalytic oxide sol (STS-21, ISHIHARA SANGYO Co., Ltd.), 44.3 parts by weight of colloidal silica (Snowtex 50, by Nissan Chemicals Industries, Ltd.), 9.9 parts by weight of silicone emulsion (Boncoat SA-5080, Dainippon Ink and Chemicals, Incorporated), 15.2 parts by weight of coloring pigment (MF Color MF5160, by Dainichiseika Color and Chemical Mfg. Co., Ltd.), 12.3 parts by weight of extender pigment (HT-300, by Otsuka Chemical Co., Ltd.) (so far indicated in terms of solid matter) and 2.4 parts by weight of film integrity assistant (CS-12, by CHISSO CORPORATION) were mixed to prepare a coating composition. The amount of water was 294 parts by weight per 100 parts of the total solid matter.

Comparative Example 1

67.8 parts by weight of fluorine resin emulsion (Lumiflon FE4300, by Asahi Glass Co., Ltd.), 26.7 parts by weight of coloring pigment (MF Color MF5160, by Dainichiseika Color and Chemical Mfg. Co., Ltd.), 5.5 parts by weight of extender pigment (Tismo N, by Otsuka Chemical Co., Ltd.) (so far indicated in terms of solid matter) and 14.7 parts by weight of film integrity assistant (CS-12, by CHISSO CORPORATION) were mixed to prepare a water-based coating composition. The amount of water was 85 parts by weight per 100 parts of the total solid matter.

Comparative Example 2

10 parts by weight of photocatalytic oxide sol (PALTITAN 5610, by NIHON PARKERRIZING Co., Ltd.), 23.9 parts by weight of colloidal silica (Snowtex 50, by Nissan Chemicals Industries, Ltd.), 11.4 parts by weight of coloring pigment (MF Color MF5160, by Dainichiseika Color and Chemical Mfg. Co., Ltd.) and 54.7 parts by weight of extender pigment (Tismo N, by Otsuka Chemical Co., Ltd.) (so far indicated in terms of solid matter) were mixed to prepare a water-based coating composition. The amount of water was 269 parts by weight per 100 parts of the total solid matter.

Comparative Example 3

9.8 parts by weight of photocatalytic oxide sol (PALTITAN 5610, by NIHON PARKERRIZING Co., Ltd.), 79.3 parts by weight of colloidal silica (Snowtex 50, by Nissan Chemicals Industries, Ltd.) and 10.9 parts by weight of fluorine resin (Lumiflon LF100, by Asahi Glass Co., Ltd.) (so far indicated in terms of solid matter) were mixed to prepare a coating composition. The amount of water was 325 parts by weight per 100 parts of the total solid matter. Right before the application of the coating composition, a hardener (Colonate HX, by Nippon Polyurethane Industries Co., Ltd.) was added in amount of 0.4 parts by weight to 100 parts of the coating composition.

(Method of Applying Coating Composition onto Base Material)

An epoxy resin primer (SK Surfepo, SK KAKEN Co., Ltd.) was spray coated onto autoclaved asbestos cement silicate boards (in accordance with JIS A5418) having been cut to 150 mm×65 mm and dried at room temperature for 24 hours. Subsequently, an acrylic urethane paint (Hiart 1000, Isamu Paint Co., Ltd.) was spray coated onto the above primer-coated autoclaved asbestos cement silicate boards and dried at room temperature for 24 hours. Then, the coating compositions of examples 1, 2, 3 and comparative examples 1, 2, 3 prepared as above were brush coated onto the respective primer-coated and acrylic urethane-painted autoclaved asbestos cement silicate boards to produce coated boards.

At the same time, an substrate-adjusting coating material (trade name: RemakePla) by Suzukafine Co., Ltd. was brush coated onto the primer-coated autoclaved asbestos cement silicate boards and dried at room temperature for 24 hours, and then the coating compositions of examples 4, 5, 6 were coated onto the respective boards to produce coated boards.

Coating was performed while standing each specimen vertically. The weight of each coating composition used for the brush coating was 15 g/m². Lastly, the above described coated boards were dried at room temperature for 24 hours to produce specimens 1 to 9.

Specimen 1: coated with the coating composition of example 1
Specimen 2: coated with the coating composition of example 2
Specimen 3: coated with the coating composition of example 3
Specimen 4: coated with the coating composition of example 4
Specimen 5: coated with the coating composition of example 5
Specimen 6: coated with the coating composition of example 6
Specimen 7: coated with the coating composition of comparative example 1
Specimen 8: coated with the coating composition of comparative example 2
Specimen 9: coated with the coating composition of comparative example 3

Preparation of Specimens for Erichsen Test and Nitrogen Monoxide Decomposition Evaluation An epoxy resin primer (SK Surfepo, SK KAKEN Co., Ltd.) was spray coated onto galvanized steel sheets (in accordance with JIS A5400) having been cut to 150 mm×65 mm and dried at room temperature for 24 hours. Subsequently, the coating compositions of examples 1, 2, 3, 4, 5, 6 and comparative examples 1, 2, 3 prepared as above were brush coated onto the respective primer-coated galvanized steel sheets to produce coated sheets.

Coating was performed while standing each specimen vertically. The weight of each coating composition used for the brush coating was 15 g/m². Lastly, the above described coated sheets were dried at room temperature for 24 hours to produce specimens 10 to 18.

Specimen 10: coated with the coating composition of example 1
Specimen 11: coated with the coating composition of example 2
Specimen 12: coated with the coating composition of example 3
Specimen 13: coated with the coating composition of example 4
Specimen 14: coated with the coating composition of example 5
Specimen 15: coated with the coating composition of example 6
Specimen 16: coated with the coating composition of comparative example 1
Specimen 17: coated with the coating composition of comparative example 2
Specimen 18: coated with the coating composition of comparative example 3

Then, the film thickness, presence or absence of cracks, adhesion, Erichsen, glossiness, alkali resistance, boiling water resistance, heating/cooling cycle, hydrophilic nature (obtained by measuring the initial contact angle of water and that after UV ray irradiation) were evaluated for each specimen. The results are shown in Table 2. The evaluations of the self-cleaning properties of each specimen are shown in Table 3. The evaluations of the nitrogen monoxide decomposition performance are shown in FIGS. 1 to 5.

TABLE 2

| | Film thickness (µm) | Presence or absence of cracks | Adhesion | | Glossiness | Alkali resistance | Boiling water resistance | Heating/cooling cycle | Initial hydrophilic nature (°) | Hydrophilic nature after UV irradiation (°) |
|---|---|---|---|---|---|---|---|---|---|---|
| Example 1 | 34 | absence | good | 10 mm or more | 35 | good | good | good | | 2.5 |
| Example 2 | 29 | absence | good | 10 mm or more | 64 | good | good | good | | 6.5 |

TABLE 2-continued

|  | Film thickness (μm) | Presence or absence of cracks | Adhesion | | Glossiness | Alkali resistance | Boiling water resistance | Heating/ cooling cycle | Initial hydrophilic nature (°) | Hydrophilic nature after UV irradiation (°) |
|---|---|---|---|---|---|---|---|---|---|---|
| Example 3 | 48 | absence | good | 10 or more | 27 | good | good | good |  | 1.9 |
| Example 4 | 35 | absence | good | 8 mm | 15 | good | good | good | 40 | 15 |
| Example 5 | 20 | absence | good | 8 mm | 15 | good | good | good | 38 | 9.2 |
| Example 6 | 30 | absence | good | 8 mm | 12 | good | good | good | 49 | 7.1 |
| Comparative Example 1 | 23 | absence | good | 10 mm | 21 | good | good | good |  | 82 |
| Comparative Example 2 | 5 | cracks present throughout the coating film | peeling present | 1 mm | 11 | peeling present | peeling present | peeling present |  | 11 |
| Comparative Example 3 | 3.5 | absence | good | 8 mm | 49 | good | good | good |  | 79 |

TABLE 3

| | Before exposure | | After one month | | After two month | |
|---|---|---|---|---|---|---|
| Specimen | Appearance | Contact angle | Appearance | Contact angle | Appearance | Contact angle |
| Example 1 | good | 21° | good | 2.5° | good | 3.3° |
| Example 2 | good | 25° | good | 6.5° | good | 5.1° |
| Example 3 | good | 13° | good | 1.9° | good | 1.5° |
| Example 4 | good | 43° | good | 30° | good | 18° |
| Example 5 | good | 38° | good | 29° | good | 12° |
| Example 6 | good | 45° | good | 10° | good | 6.1° |
| Comparative Example 1 | good | 85° | good | 82° | whitening due to dirt present | 77° |
| Comparative Example 2 | good | 19° | good | 11° | film peeling present | 9.0° |
| Comparative Example 3 | good | 78° | good | 79° | whitening due to dirt present | 71° |

Evaluation Methods Used were as Follows.

Film thickness: Film thickness was measured by observing each specimen from its cross section with a scanning electron microscope (S-4100, by Hitachi Ltd.).

Presence or absence of cracks: The presence or absence of cracks was checked by observing the surface of each specimen with an optical microscope (VF-7500, by KEYENCE Corporation).

Adhesion: Adhesion was measured by cross-cut adhesion test speculated in JIS K5400. Specifically, 2 mm-wide cuts were made on the coating film of each prepared specimen at right angles so that 25 squares 1 by 1 cm in size were formed. Then, adhesive cellophane tape was applied onto the specimen so that the tape covered all the squares completely. After that, the tape was torn off the specimen and the number of the squares left stuck on the specimen was counted.

Erichsen evaluation: Each specimen, which was prepared by applying a coating composition on a metal plate, was deformed by pushing a steel ball out against the back side of the specimen using an Erichsen tester in accordance with JIS B7729. The distance the steel ball was pushed out before cracking, breaking or peeling was caused in the coating film was checked.

Glossiness: The glossiness of each prepared specimen was measured with VGS-1D by Nippon Denshoku.

Alkali resistance: The appearance of each specimen was visually evaluated after it was immersed in a saturated aqueous solution of calcium hydroxide at room temperature for 7 days, washed with distilled water after taken out, and fully dried.

Boiling water resistance: The appearance of each specimen was visually evaluated after it was immersed in boiling water at 95° C. or more for 2 hours, washed with distilled water after taken out, and fully dried.

Heating/cooling cycle: Each specimen was immersed in a temperature controlled bath at 50° C. for 3 hours, in a temperature controlled batch at −20° C. for 3 hours and then in a temperature controlled bath at 25° C. for 18 hours. This cycle was repeated 10 times. After the specimen was taken out from the bath, washed with distilled water and fully dried, its appearance was visually evaluated.

Hydrophilic nature (Initial contact angle): The contact angle of water on the surface of each specimen was measured with CX-150 by Kyowa Interface Science Co., Ltd.

Hydrophilic nature (when applying UV irradiation): Each prepared specimen was exposed to UV light of 0.5 mW/cm$^2$ generated from a BLB lamp for 7 days and to UV light of 3.0 mW/cm$^2$ generated from a germicidal lamp for 3 days. Then, the contact angle of water on the surface of the specimen was measured with CX-150 by Kyowa Interface Science Co., Ltd.

Self-cleaning properties (outdoor exposure): Each prepared specimen was located outdoors while allowing it to face southward and incline at 45° relative to the vertical direction. The appearance of the specimen before exposure, after one-month exposure and after two-month exposure was evaluated and the contact angle of water on the surface of the specimen was measured.

Figure 6:
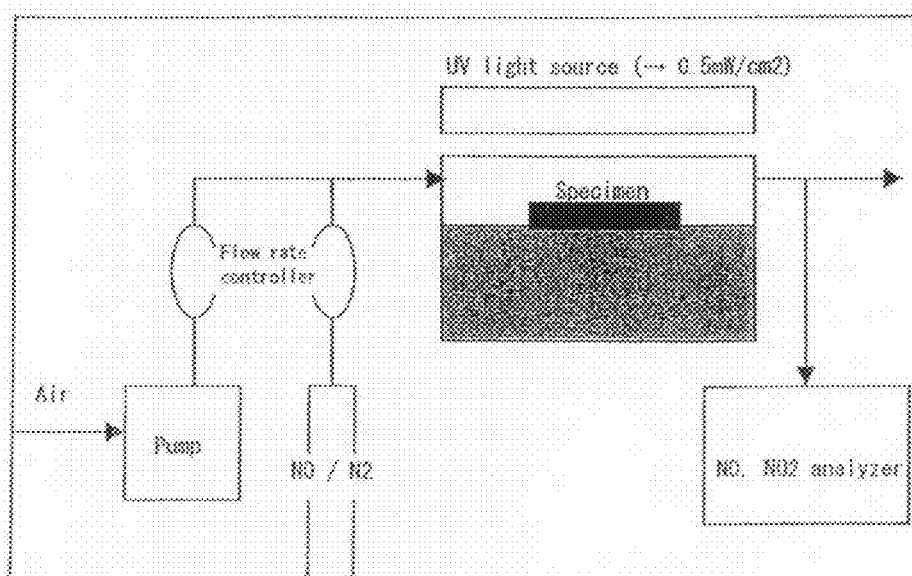
FIG. 6 is a schematic block diagram of an apparatus for evaluating nitrogen monoxide decomposition performance.

Evaluation of nitrogen monoxide decomposition performance: A schematic block diagram of the apparatus used for the evaluation is shown in FIG. 6. The nitrogen monoxide concentration on the inlet side was adjusted with air to 0.25 ppm. The flow rate was adjusted to 1 liter per minute. After placing each specimen in the apparatus, the gas was let to flow for 30 minutes until the flow rate was stabilized. Then, the specimen was exposed to UV light of 0.5 mW/cm$^2$ from a BLB lamp. The concentrations of nitrogen monoxide and nitrogen dioxide were recorded.

This invention will be described in terms of another preferred embodiment.

The self-cleaning water-based coating composition in accordance with one preferred embodiment of this invention provides a coating film such that the contact angle of water on the surface of the coating film is decreased to 20° or less with the aid of light irradiation; specifically, the coating composition include the following ingredients (a), (b) and (c):

(a) a silicone resin precursor composed of a water-based emulsion capable of forming a silicone resin film and/or a water-based emulsion capable of forming a fluorine resin and/or colloidal silica, (b) photocatalytic particles or photocatalytic sol, and (c) water, wherein the ingredient (b) constitutes less than 5% by weight of the total solid matter of the coating composition.

In this invention, the ingredient (a), that is, a silicone resin precursor composed of a water-based emulsion capable of forming a silicone resin film and/or a water-based emulsion capable of forming a fluorine resin and/or colloidal silica, is a binder component of the coating which contributes to fixing photocatalytic particles and pigments. Preferably, the total content of such resins in the total solid matter of the coating composition is 10 to 90% by weight. If the content is less than 10%, the physical properties of the coating film, such as the adhesion to organic grounds, film hardness, water resistance and alkali resistance, deteriorate, whereas if the content is 90% or more, the components such as titanium oxide and coloring pigment become insufficient, which inhibits the coating film from exerting desired function.

Concrete examples of silicone emulsions suitable used are emulsions of hydrolysis or dehydration condensation polymers of, for example, methyltrimethoxysilane, methyltriethoxysilane, methyltrichlorosilane, methyltribromosilane, methyltriisopropoxysilane, methyltri-t-butoxysilane, ethyltrimethoxysilane, ethyltriethoxysilane, ethyltrichlorosilane, ethyltribromosilane, ethyltriisopropoxysilane, ethyltri-t-butoxysilane, n-propyltrimethoxysilane, n-propyltriethoxysilane, n-propyltrichlorosilane, n-propyltribromosilane, n-propyltriisopropoxysilane, n-propyltri-t-butoxysilane, n-hexyltrimethoxysilane, n-hexyltriethoxysilane, n-hexyltrichlorosilane, n-hexyltribromosilane, n-hexyltriisopropoxysilane, n-hexyltri-t-butoxysilane, n-decyltrimethoxysilane, n-decyltriethoxysilane, n-decyltrichlorosilane, n-decyltribromosilane, n-decyltriisopropoxysilane, n-decyltri-t-butoxysilane, n-octatrimethoxysilane, n-octatriethoxysilane, n-octatrichlorosilane, n-octatribromosilane, n-octatriisopropoxysilane, n-octatri-t-butoxysilane, phenyltrimethoxysilane, phenyltriethoxysilane, phenyltrichlorosilane, phenyltribromosilane, phenyltriisopropoxysilane, phenyltri-t-butoxysilane, vinyltrichlorosilane, vinyltribromosilane, vinyltrimethoxysilane, vinyltriethoxysilane, vinyltriisopropoxysilane, vinyltri-t-butoxysilane, trifluoropropyltrichlorosilane, trifluoropropyltritidibromsilane, trifluoropropyltrimethoxysilane, trifluoropropyltriethoxysilane, vinyltrichlorosilane, trifluoropropyltriisopropoxysilane, trifluoropropyltri-t-butoxysilane, γ-glycidoxypropyltrimethoxysilane, γ-glycidoxypropyltriethoxysilane, γ-glycidoxypropyltriisopropoxysilane, γ-glycidoxypropyltri-t-butoxysilane, γ-methacryloxypropyltrimethoxysilane, γ-methacryloxypropyltriethoxysilane, γ-methacryloxypropyltriisopropoxysilane, γ-methacryloxypropyltri-t-butoxysilane, γ-aminopropyltrimethoxysilane, γ-aminopropyltriethoxysilane, γ-aminopropyltriisopropoxysilane, γ-aminomethacryloxypropyltri-t-butoxysilane, γ-methylcaptopropyltrimethoxysilane, γ-methylcaptopropyltriethoxysilane, γ-methylcaptopropyltriisopropoxysilane, γ-methylcaptopropyltri-t-butoxysilane, β-(3,4-epoxycyclohexyl)ethyltrimethoxysilane and β-(3,4-epoxycyclohexyl)ethyltriethoxysilane.

Examples of fluorine resin emulsions suitably used are emulsions of polymer having a fluoro group, such as polytetrafluoroethylene, poly(vinylidene fluoride), poly(vinyl fluoride), polychlorotrifluoroethylene, tetrafluoroethylene-hexafluoropropylene copolymer, ethylene-tetrafluoroethylene copolymer, ethylene-chlorotrifluoroethylene copolymer, tetrafluoroethylene-perfluoroalkylvinylether copolymer, perfluorocyclo polymer, vinylether-fluoroolefin copolymer, vinylester-fluoroolefin copolymer, tetrafluoroethylene-vinylether copolymer, chlorotrifluoroethylene-vinylether copolymer, tetrafluoroethylene urethane crosslinked polymer, tetrafluoroethylene epoxy crosslinked polymer, tetrafluoroethylene acryl crosslinked polymer and tetrafluoroethylene melamine crosslinked polymer. Preferably, the average particle size of the particles in the emulsion is 50 to 300 nm.

To assist the film integrity of the emulsion, it is preferable to add a solvent as a film integrity assistant. Concrete examples of film integrity assistants suitably used are: alcohols such as methyl alcohol, ethyl alcohol, propyl alcohol, butyl alcohol, hexyl alcohol, octyl alcohol and texanol; ethers such as cellosolve, ethyl cellosolve, butyl cellosolve, diethylene glycol monoethyl ether, diethylene glycol monobutyl ether, propylene glycol monoethyl ether, propylene glycol monoisobutyl ether, dipropylene glycol monobutyl ether, dipropylene glycol isobutyl ether, tripropylene glycol monoethyl ether, tripropylene glycol monobutyl ether and tripropylene glycol monoisobutyl ether; glycol ether esters such as butylcellosolve acetate, diethylene glycol monoethyl ether acetate, dipropylene glycol isobutyl ether acetate and tripropylene glycol monoisobutyl ether acetate. Preferably, the amount of the film integrity assistant added to the emulsion resin is less than 50% by weight. If the amount is 50% or more, cobwebbing of resin or the like might occur.

With respect to colloidal silica, its particle size is preferably (not limited to) 5 to 150 nm. Colloidal silica in the form of a particle is preferably used; however, chain like, rod like, feather like or whisker like colloidal silica can also be used. As a dispersion medium of colloidal silica, water is preferable, but organic solvents can also be used.

The self-cleaning water-based coating composition can include an organic resin, as a second resin, in addition to the resins added as the ingredient (a). The resin that can be added as a second resin is at least one type of organic resin selected from the group consisting of alkyd resin, epoxy resin, acrylic resin, silicone-acrylic resin, phenol resin, fluorine resin, polyester resin, chlorinated rubber resin, urethane resin and melamine resin. Preferably, the amount of the second resin added is less than 100% by weight of the total amount of the resins added as the ingredient (a). If the amount is more than 100% by weight of the total amount of the resins added as the ingredient (a), the weatherability of the coating film deteriorates, because the second resins are composed of organic compounds susceptible to oxidation decomposition by photocatalyst.

Examples of photocatalytic particles used as the ingredient (b) include: particles of titanium oxide, zinc oxide and tin oxide, but not limited to these ones, as long as they have photocatalytic activity. Photocatalytic particles with V, Fe, Co, Ni, Cu, Zn, Ru, Rh, Pd, Ag, Pt or Au, as a second component, carried inside themselves and/or on their surface are preferable, because they have improved photocatalytic activity.

Of the above photocatalytic particles, those of titanium oxide are preferably used because of their photocatalytic activity, chemical stability, safety, availability and low cost. Anatase type of titanium oxide is particularly preferably used because of its strong photocatalytic activity.

Photocatalytic particles can be used in the form of powder or sol. To avoid the decomposition of the organic resin ingredient in the coating film, preferably photocatalytic particles constitute less than 5% by weight of the total solid matter of the coating composition.

The primary particle size of titanium dioxide is preferably 1 to 100 nm. The primary particles less than 1 nm in size are not preferable because the dispersion of such fine particles is not stable and their secondary agglomeration is likely to occur, which may cause the deterioration of photocatalytic activity when forming a coating film. At the same time, the primary particles more than 100 nm in size are not preferable, either, because they may also cause the deterioration of photocatalytic activity when forming a coating film.

Examples of inorganic extender pigments suitably used in this invention include: titanium oxide whisker, calcium carbonate whisker, potassium titanate whisker, aluminum borate whisker, mica, talc, barium sulfate, potassium carbonate, silica sand, diatomaceous earth, kaolin, clay, potter's clay and barium carbonate. Because the above described pigments are inorganic ingredients, they can provide a coating film to be formed with excellent weatherability. The use of the above described whiskers, mica or talc is particularly effective in preventing the occurrence of cracks when the coating film undergoes dry shrinkage or thermal shock. To obtain a crack-preventing effect, preferably the amount of these inorganic extender pigments added is more than 5% by weight of the total solid matter of the coating composition and preferably 10% by weight or more. Further, the amount is preferably 50% by weight or less. The reason is that if the amount is more than 50% by weight, the hardness and alkali resistance of the coating film to be formed deteriorate.

In whiskers, it is known that their aspect ratio (length: diameter ratio) has an effect on the prevention of cracks, and examples described later confirmed that cracks occurred a little in mica (in the form of a sheet), but not in whiskers, even when they were added in the same amount. Accordingly, of mica and whiskers, whiskers are preferable.

Coloring pigments added to coatings are classified into two broad types: inorganic and organic. However, when used in photocatalyst-containing coatings, inorganic coloring pigments are preferable because organic pigments are decomposed by photocatalytic action and discolored.

Examples of inorganic coloring pigments include: metal oxides such as titanium oxide white, titanium yellow, spinel green, zinc white, red iron oxide, chromium oxide, cobalt blue and black iron oxide; metal hydroxides such as alumina white and yellow oxide; ferrocyanides such as Prussian blue; lead chromates such as chrome yellow, zinc chromate and molybdate red; sulfides such as zinc sulfide, vermilion, cadmium yellow and cadmium red; selenides; sulfates such as barite and precipitated barium sulfate; carbonates such as ground calcium carbonate and precipitated calcium carbonate; silicates such as silicate hydrate, clay and ultramarine; carbons such as carbon black; metal powders such as aluminum powder, bronze powder and zinc powder; and pearl pigments such as titanated mica.

As the solvent contained in the composition of this invention, (c) water is used.

In the coating composition of this invention, preferably the sum of the solid matter constitutes 10% by weight or more of the entire coating composition. This makes it easy to pigment the coating film to be formed uniformly. Further, sags of the coating at the time of coating application become hard to occur.

In the coating composition of this invention, much preferably the sum of the solid matter in the ingredients (a), (b) constitutes more than 30% by weight of the entire coating composition.

This makes it possible to obtain a sufficient film thickness only by one- or two-time roller coating without lapping the coating composition one over the other and a coating film which produces a UV ray shielding effect and exerts good weatherability.

In the coating composition of this invention, preferably the sum of the solid matter in ingredients (a), (b) constitutes 60% by weight or less of the entire coating composition.

This provides sufficient can-stability.

Preferably, the thickness of the coating film obtained using the coating composition of this invention is 5 μm or more and preferably 20 μm or more. With the film 5 μm thick, the UV ray shielding efficiency is 95% or more. With the film 20 μm or more thick, the UV ray shielding efficiency is 99.9% or more. This makes it possible to prevent the substrate from deteriorating due to UV rays and also prevent the ground from being attacked by the photocatalytic layer or from deteriorating due to UV rays.

Additives such as anti-settling agent, surfactant, anti-foaming agent, pH adjuster, thickening agent and hardener may be added to the coating composition of this invention, depending on the situation.

The coating composition of this invention can be applied directly onto an organic ground and dried at ordinary temperature, and the resultant coated thing has excellent durability and weatherability. "Ordinary temperature" herein used means normal temperature, generally 0 to 40° C. Examples of coating methods suitably used are, not limited to, roller coating, brush coating, spray coating, flow-coating, dip coating and spin coating.

When intending to use the coating composition of this invention outdoors, where the coating's self-cleaning action with the aid of rainfall can be expected and the opaqueness of the coating film is not a problem, base materials to which the coating composition is applicable are, for example, metals, ceramics, plastics, wood, stone, cement, concrete, the combination thereof, the laminates thereof, and the things coated therewith. More specifically, the applications of the coating composition of this invention include: for example, external facing of building such as exterior walls and roofs; external facing and coating of transportation means such as window frames, rolling stock, airplanes, shipping, bicycles, motorcycles; coating of sign boards, traffic signs, sound insulating walls, insulators, rain shutter doors, road lamps, pavements, outdoor lighting, artificial waterfalls, stones/tiles for artificial fountain, bridges, exterior wall materials, sealers between walls or glasses, guard rails, verandas, vending machines, outdoor units of air conditioners, outdoor benches, various kinds of displays, shutters, tollgates, fare boxes, gutters, equipment or articles; external facing and coating of ad pillars; structural members; and films or emblems that can be stuck to the above described articles.

In the following examples of self-cleaning water-based coating compositions in accordance with this invention will be described.

First, materials will be shown which constitute the coating compositions in accordance with this invention.

<Materials Constituting Coatings>

Potassium titanate whisker: Tismo N, by Otsuka Chemical Co., Ltd.

Talc: P3, by Nippon Talc Co., Ltd.

Water base paste of inorganic coloring pigment: titanium oxide white, MF5760, by Dainichiseika Color and Chemical Mfg. Co., Ltd., with a solid content of 65%

Photocatalytic particles: titanium oxide powder, STS-21, ISHIHARA SANGYO Co., Ltd. with an average primer particle size of 10 nm and a solid content of 38.4%

Silicone resin: silicone emulsion, BS45, by Wacker Chemicals East Asia, with a resin content of 50%

Fluorine resin: fluorine resin emulsion, Lumiflon FE4300, by Asahi Glass Co., Ltd., with a resin content of 48%

Acrylic urethane resin: acrylic urethane emulsion, Boncoat CC5050, by Dainippon Ink and Chemicals, Incorporated, with a resin content of 45%

Colloidal silica: ST-50, by Nissan Chemicals Industries, Ltd., with an average primer particle size of 20 to 30 nm and a solid content of 49%

Solvent: water

Film integrity assistant: texanol, CS-12, by CHISSO CORPORATION

The materials shown above were mixed at ratios shown in examples and fully agitated so as to be used as coating compositions.

Example 7

39.4 parts by weight of water was added to a mixture of 23.0 parts by weight of inorganic pigment paste, 13.1 parts by weight of potassium titanate whisker powder and 4.6 parts by weight of titanium oxide sol. The mixture was kneaded using glass beads to prepare a pigment base. 19.9 parts by weight of silicone liquid emulsion and the film integrity assistant were added to 80.1 parts by weight of pigment base and agitated with an agitating element for 5 minutes to produce a coating composition #1.

Example 8

45.2 parts by weight of water was added to a mixture of 23.4 parts by weight of inorganic pigment paste, 15.0 parts by weight of potassium titanate whisker powder and 0.5 parts by weight of titanium oxide sol. The mixture was kneaded using glass beads to prepare a pigment base. 15.9 parts by weight of fluorine liquid emulsion and 2.7 parts by weight of film integrity assistant were added to 84.1 parts by weight of pigment base and agitated with an agitating element for 5 minutes to produce a coating composition #2.

Example 9

97.2 parts by weight of water was added to a mixture of 24.7 parts by weight of inorganic pigment paste, 8.2 parts by weight of talc, 7.8 parts by weight of potassium titanate whisker powder and 5.7 parts by weight of titanium oxide sol. The mixture was kneaded using glass beads to prepare a pigment base. 14.7 parts by weight of silicone liquid emulsion, 15.3 parts by weight of fluorine resin liquid emulsion and 3.3 parts by weight of film integrity assistant were added to 143.6 parts by weight of pigment base and water was further added so that the solid content in the mixture became 40% by weight. The resultant mixture was agitated with an agitating element for 5 minutes to produce a coating composition #3.

Example 10

25.3 parts by weight of water was added to a mixture of 19.6 parts by weight of inorganic pigment paste, 8.4 parts by weight of potassium titanate whisker powder and 4.4 parts by weight of titanium oxide sol. The mixture was kneaded using glass beads to prepare a pigment base. 15.8 parts by weight of colloidal silica, 13.5 parts by weight of silicone liquid emulsion, 13.2 parts by weight of fluorine resin liquid emulsion and 3.5 parts by weight of film integrity assistant were added to 57.7 parts by weight of pigment base and water was further added so that the solid content in the mixture became 40% by weight. The resultant mixture was agitated with an agitating element for 5 minutes to produce a coating composition #4.

Example 11

23.3 parts by weight of water was added to a mixture of 29.4 parts by weight of inorganic pigment paste, 7.8 parts by weight of potassium titanate whisker powder and 5.2 parts by weight of titanium oxide sol. The mixture was kneaded using glass beads to prepare a pigment base. 15.6 parts by weight of colloidal silica, 18.7 parts by weight of silicone liquid emulsion and 3.1 parts by weight of film integrity assistant were added to 65.7 parts by weight of pigment base and water was further added so that the solid content in the mixture became 40% by weight. The resultant mixture was agitated with an agitating element for 5 minutes to produce a coating composition #5.

Example 12

22.7 parts by weight of water was added to a mixture of 32.5 parts by weight of inorganic pigment paste, 7.6 parts by weight of potassium titanate whisker powder and 0.58 parts by weight of titanium oxide sol. The mixture was kneaded using glass beads to prepare a pigment base. 27.8 parts by weight of colloidal silica, 8.9 parts by weight of silicone liquid emulsion and 1.0 parts by weight of film integrity assistant were added to 63.4 parts by weight of pigment base and water was further added so that the solid content in the mixture became 40% by weight. The resultant mixture was agitated with an agitating element for 5 minutes to produce a coating composition #6.

Example 13

10 parts by weight of water was added to a mixture of 18.4 parts by weight of inorganic pigment paste, 5.2 parts by weight of talc, 2.6 parts by weight of potassium titanate whisker powder and 1.4 parts by weight of titanium oxide sol. The mixture was kneaded using glass beads to prepare a pigment base. 31.2 parts by weight of colloidal silica, 33.5 parts by weight of fluorine resin liquid emulsion and 3.7 parts by weight of film integrity assistant were added to 37.6 parts by weight of pigment base and water was further added so that the solid content in the mixture became 40% by weight. The resultant mixture was agitated with an agitating element for 5 minutes to produce a coating composition #7.

Example 14

22.8 parts by weight of water was added to a mixture of 25.4 parts by weight of inorganic pigment paste, 7.6 parts by weight of potassium titanate whisker powder and 5.1 parts by weight of titanium oxide sol. The mixture was kneaded using glass beads to prepare a pigment base. 15.3 parts by weight of colloidal silica, 14.0 parts by weight of silicone liquid emulsion, 9.7 parts by weight of acrylic urethane resin liquid emulsion and 4.2 parts by weight of film integrity assistant were added to 60.9 parts by weight of pigment base and water was further added so that the solid content in the mixture became 40% by weight. The resultant mixture was agitated with an agitating element for 5 minutes to produce a coating composition #8.

Comparative Example 4

79.3 parts by weight of water was added to a mixture of 36.6 parts by weight of inorganic pigment paste and 13.9 parts by weight of titanium oxide sol. The mixture was kneaded using glass beads to prepare a pigment base. 49.6 parts by weight of fluorine resin liquid emulsion and 8.2 parts by weight of film integrity assistant were added to 129.3 parts by weight of pigment base and water was further added so that the solid content in the mixture became 40% by weight. The resultant mixture was agitated with an agitating element for 5 minutes to produce a coating composition #10.

Comparative Example 5

77.8 parts by weight of water was added to a mixture of 35.8 parts by weight of inorganic pigment paste and 6.1 parts by weight of titanium oxide sol. The mixture was kneaded using glass beads to prepare a pigment base. 58.1 parts by weight of acrylic urethane liquid emulsion and 9.2 parts by weight of film integrity assistant were added to 119.7 parts by weight of pigment base and water was added so that the solid content in the mixture became 40% by weight. The resultant mixture was agitated with an agitating element for 5 minutes to produce a coating composition #11.

The composition of the solid matter is shown in Table 4 for each of the coating compositions #1 to #11. 0.3% by weight of anti-foaming agent (SN defoamer 397, by San Nopco Limited) was added to each of the coating compositions #1 to #11.

TABLE 4

Composition and concentration of solid matter in each of the coating compositions of examples and comparative examples (% by weight)

| | Silicone emulsion | Colloidal silica | Fluorine resin emulsion | Photocatalytic titanium oxide | Pigment (white) | Potassium titanate whisker | Talc | Acrylic urethane emulsion | Solid content (%) |
|---|---|---|---|---|---|---|---|---|---|
| Example 7 | 25 | | | 4.5 | 37.5 | 33 | | | 39.8 |
| Example 8 | | | 20 | 0.5 | 40 | 39.5 | | | 38.1 |
| Example 9 | 15 | | 15 | 4.5 | 32.7 | 16 | 16.8 | | 40.0 |
| Example 10 | 15 | 15 | 15 | 4.5 | 30 | 20.5 | | | 40.0 |
| Example 11 | 21 | 14 | | 4.5 | 43 | 17.5 | | | 40.0 |
| Example 12 | 10 | 25 | | 0.5 | 47.5 | 17.0 | | | 40.0 |
| Example 13 | | 30 | 31 | 1.0 | 23 | 5 | 10 | | 40.0 |
| Example 14 | 16 | 14 | | 4.5 | 38 | 17.5 | | 10 | 40.0 |
| Example 15 | 15.5 | 80 | | 4.5 | | | | | 40.0 |
| Comparative example 4 | | | 45 | 10 | 45 | | | | 40.0 |
| Comparative example 5 | | | | 10 | 45 | | | 45 | 40.0 |

Example 15

2.6 parts by weight of titanium oxide sol, 82 parts by weight of colloidal silica, 15.4 parts by weight of silicone liquid emulsion and 2.6 parts by weight of film integrity assistant were mixed, and water was added to the mixture so that the solid content in the mixture became 40% by weight. The resultant mixture was agitated with an agitating element for 5 minutes to produce a coating composition #9.

1. Evaluation of Coating Film Performance

<Method of Coating Specimen>

Acrylic organic sealer (EM Sealer, by Suzukafine Co., Ltd.) was spray coated onto slates having been cut to 150 mm×65 mm and dried at room temperature for 16 hours. The thickness of the acrylic sealer film was 40 to 50 μm. Then, the coating compositions shown in examples and comparative examples were spray coated directly onto the respective sealer-coated slates to produce coated slates. The thickness of each coating film was 40 to 50 µm. Evaluation of the coating films was performed after subjecting the coated slates to prescribed curing. Heat drying was conducted depending on the situation.

(Presence or Absence of Cracks)

After application of the respective coating compositions, the coated slates were dried at room temperature one day. The presence or absence of cracks was checked by observing the surface of each specimen visually and with an optical microscope. The optical microscope used was VK-8500, by KEYENCE Corporation and the observation was performed at ×200 magnification. The films on which cracks were observed visually were judged as P, those on which cracks were observed under the microscope as F, and those on which no cracks were observed as G.

(Initial Adhesion)

After application of the respective coating compositions, the coated slates were dried at room temperature for 14 days. X-cut adhesion test was performed for each coated slate in accordance with JIS K5400 8.5. The films that did not peel at all were judged as G, those which partially peeled as F, and those which completely peeled as P.

The evaluation of the adhesion to an organic painted plate and to an acrylic plate was also performed, separately. The test coating compositions were spray coated onto the respective test base materials. The thickness of the coating films was adjusted to 20 µm. The specimens were dried at room temperature for 14 days and then subjected to cross-cut adhesion test in accordance with JIS K5400 8.5. The organic painted plates used were prepared by applying an epoxy clear sealer coating onto slates, drying the sealer-coated slates at ordinary temperature for one day, and applying a fluorine coating (Bonflon, by Asahi Glass Coat & Resin, Co., Ltd.), an urethane coating (Wideurethane, by Suzukafine Co., Ltd.), a silicone-acrylic coating (Neosilica, by Isamu Paint Co., Ltd.) or an acrylic emulsion coating (AEP Modem, by Suzukafine Co., Ltd.), as face coating, onto the respective sealer-coated slates at ordinary temperature.

(Weathering Test)

Accelerated weathering test was conducted for the specimens having been dried at room temperature for 2 weeks after coated with the respective coating compositions. The evaluation was performed based on the accelerated weathering test using sunshine carbon arc in accordance with JIS K5400 9.8. After the test, the degree of cracking and chalking was checked. The presence or absence of cracks was confirmed in the same manner as above, while that of chalking by checking the degree of blooming with fingers (the films with no blooming confirmed thereon were judged as G, those with a little blooming as F, those with remarkable blooming as P, and those with peeling occurring at the interface with the primer as VP).

(Alkali Resistance)

Alkali-resistance test was performed in accordance with JIS K5400 8.21. The procedure for the test was as follows: pour 5% aqueous solution of sodium carbonate at 20±2° C. into a 300 ml beaker to a height of approximately 90 mm; dip each specimen in the aqueous solution while standing the same vertically; take the specimen out of the beaker after 24-hour dipping and subsequently wash its surface while pouring water softly; wipe the attached water lightly off the specimen and allow the specimen left stand at the test room for 3 hours; and check the presence of cracking, swelling and elution by softening on the surface of the specimen and compare the degree of haze and change in color caused in the dipped portion of the specimen with that of the non-dipped portion.

Quality Standard: The films were judged as G when their surface had none of cracking, swelling, peeling and elution by softening after dipped in alkali and haze and change in color on their alkali-dipped portion are not serious, even when compared with those of the alkali-non-dipped portion.

The specimens having undergone alkali-resistance test were washed and dried at room temperature for 3 hours. Then, adhesive cellophane tape was put on each specimen and rubbed with an eraser so that the tape was completely stuck on its coating film. One to two minutes after the tape was stuck on the coating film, one end of the tape was picked and kept perpendicular to the coating film surface and the tape was torn off the coating film in an instance. When the films have tear resistance as high as that of the films before the alkali-resistance test, they were judged as G. When they have a little lower tear resistance than that of the films before the alkali-resistance test, they were judged as F. And when they have little tear resistance, they were judged as P.

(Evaluation of Hydrophilic Nature)

Specimens having been subjected to heat drying at 180° C. for 20 minutes after their coating films were dried were exposed to UV light of 5 mW/cm$^2$ from a germicidal lamp so that the change in contact angle of water on their coating films was measured, and their hydrophilic nature was evaluated by the number of days it took to decrease the contact angle to 20° or less. At the same time, for specimens not having been subjected to heat drying, but located outdoors (with their coating surface facing southward and inclined at 45°) right after the application of coating composition, their hydrophilic nature was also evaluated in the same manner as above. The contact angle was measured with CX-150 by Kyowa Interface Science Co., Ltd. after an elapse of 3 to 5 seconds after dropping a water droplet through the micro-syringe.

The evaluations of cracking after coating, initial adhesion, weatherability, alkali resistance and hydrophilic nature for the coating compositions of examples and comparative examples are shown in Table 5. The adhesion of the coating compositions of examples to organic painted plates and an acrylic plate was also tested. The results are shown in Table 6.

TABLE 5

Evaluations for coating films of examples & comparative examples (1)

|  | Cracking after coating | Tape adhesion after coating | Weatherability | | Alkali resistance appearance | tape test | Hydrophilic nature | |
|---|---|---|---|---|---|---|---|---|
|  |  |  | cracking | chalking |  |  | germicidal lamp | outdoor exposure |
| Example 7 | G | G | G | G | G | G | 5 days | 155 days |
| Example 8 | G | G | G | G | G | G | 4 days | 123 days |
| Example 9 | G | G | G | G | G | G | 4 days | 90 days |

TABLE 5-continued

Evaluations for coating films of examples & comparative examples (1)

| | Cracking after coating | Tape adhesion after coating | Weatherability cracking | Weatherability chalking | Alkali resistance tape appearance | Alkali resistance test | Hydrophilic nature germicidal lamp | Hydrophilic nature outdoor exposure |
|---|---|---|---|---|---|---|---|---|
| Example 10 | G | G | G | G | G | G | 1 day | 45 days |
| Example 11 | G | G | G | G | G | G | 1 day | 20 days |
| Example 12 | G | G | G | G | G | G | 4 days | 65 days |
| Example 13 | G | G | G | G | G | G | 2 days | 65 days |
| Example 14 | G | G | G | G | G | G | 2 days | 65 days |
| Example 15 | G | G | G | F | G | G | 5 days | 155 days |
| Comparative example 4 | G | G | F | P | G | G | 1 day | 45 days |
| Comparative example 5 | G | G | P | VP | G | G | 1 day | 45 days |

TABLE 6

Cross-cut adhesion test on organic painted plates and acrylic plate (2)

| | Face coating on organic painted plates | | | | |
|---|---|---|---|---|---|
| | fluorine coating | urethane coating | silicone-acrylic coating | acrylic coating | Acrylic plate |
| Example 10 | 100/100 | 100/100 | 100/100 | 100/100 | 100/100 |
| Example 13 | 100/100 | 100/100 | 100/100 | 100/100 | 100/100 |

As described above, in coating compositions that develop self-cleaning properties in the presence of photocatalyst, when the binder components are a silicone resin precursor composed of a water-based emulsion capable of forming a silicone resin film and/or a water-based emulsion capable of forming a fluorine resin and/or colloidal silica and the photocatalyst content in the solid matter of the coating film to be formed is less than 5% by weight, a coating member can be obtained which has good adhesion even to organic grounds and excellent durability. If an inorganic coloring pigment and an inorganic extender pigment are added to the coating compositions, the durability of the resultant coating member is further improved. The evaluations confirmed that when adding an organic resin as a binder different from the above described ones, the same effects can be obtained.

This invention will be described in terms of still another preferred embodiment.

The self-cleaning water-based coating composition in accordance with one preferred embodiment of this invention provides a coating film such that the contact angle of water on the surface of the coating film is decreased to 20° or less with the aid of light irradiation; specifically, the coating composition include the following ingredients (a), (b), (c), (d) and (e):

(a) a silicone resin precursor composed of a water-based emulsion capable of forming a silicone resin film and/or a water-based emulsion capable of forming a fluorine resin,
(b) at least one selected from the group consisting of whisker, mica and talc,
(c) photocatalytic particles,
(d) an inorganic coloring pigment, and
(e) water.

In the following each of the above ingredients will be described.

The ingredient (a), that is, a silicone resin precursor composed of a water-based emulsion capable of forming a silicone resin film and/or a water-based emulsion capable of forming a fluorine resin, is a binder component of the coating which contributes to fixing photocatalytic particles and pigments.

Concrete examples of silicone emulsions suitable used are emulsions of hydrolysis or dehydration condensation polymers of, for example, methyltrimethoxysilane, methyltriethoxysilane, methyltrichlorosilane, methyltribromosilane, methyltriisopropoxysilane, methyltri-t-butoxysilane, ethyltrimethoxysilane, ethyltriethoxysilane, ethyltrichlorosilane, ethyltribromosilane, ethyltriisopropoxysilane, ethyltri-t-butoxysilane, n-propyltrimethoxysilane, n-propyltriethoxysilane, n-propyltrichlorosilane, n-propyltribromosilane, n-propyltriisopropoxysilane, n-propyltri-t-butoxysilane, n-hexyltrimethoxysilane, n-hexyltriethoxysilane, n-hexyltrichlorosilane, n-hexyltribromosilane, n-hexyltriisopropoxysilane, n-hexyltri-t-butoxysilane, n-decyltrimethoxysilane, n-decyltriethoxysilane, n-decyltrichlorosilane, n-decyltribromosilane, n-decyltriisopropoxysilane, n-decyltri-t-butoxysilane, n-octatrimethoxysilane, n-octatriethoxysilane, n-octatrichlorosilane, n-octatribromosilane, n-octatriisopropoxysilane, n-octatri-t-butoxysilane, phenyltrimethoxysilane, phenyltriethoxysilane, phenyltrichlorosilane, phenyltribromosilane, phenyltriisopropoxysilane, phenyltri-t-butoxysilane, vinyltrichlorosilane, vinyltribromosilane, vinyltrimethoxysilane, vinyltriethoxysilane, vinyltriisopropoxysilane, vinyltri-t-butoxysilane, trifluoropropyltrichlorosilane, trifluoropropyltritidibromsilane, trifluoropropyltrirnethoxysilane, trifluoropropyltriethoxysilane, vinyltrichlorosilane, trifluoropropyltriisopropoxysilane, trifluoropropyltri-t-butoxysilane, γ-glycidoxypropyltrimethoxysilane, γ-glycidoxypropyltriethoxysilane, γ-glycidoxypropyltriisopropoxysilane, γ-glycidoxypropyltri-t-butoxysilane, γ-methacryloxypropyltrimethoxysilane, γ-methacryloxypropyltriethoxysilane, γ-methacryloxypropyltriisopropoxysilane, γ-methacryloxypropyltri-t-butoxysilane, γ-aminopropyltrimethoxysilane, γ-aminopropyltriethoxysilane, γ-aminopropyltriisopropoxysilane, γ-aminomethacryloxypropyltri-t-butoxysilane, γ-methylcaptopropyltrimethoxysilane, γ-methylcaptopropyltriethoxysilane, γ-methylcaptopropyltriisopropoxysilane, γ-methylcaptopropyltri-t-butoxysilane, β-(3,4-epoxycyclohexyl)ethyltrimethoxysilane and β-(3,4-epoxycyclohexyl)ethyltriethoxysilane.

Examples of fluorine resin emulsions suitably used are emulsions of polymer having a fluoro group, such as polytetrafluoroethylene, poly(vinylidene fluoride), poly(vinyl fluoride), polychlorotrifluoroethylene, tetrafluoroethylene-hexafluoropropylene copolymer, ethylene-tetrafluoroethylene copolymer, ethylene-chlorotrifluoroethylene copolymer, tetrafluoroethylene-perfluoroalkylvinylether copolymer, perfluorocyclo polymer, vinylether-fluoroolefin copolymer, vinylester-fluoroolefin copolymer, tetrafluoroethylene-vinylether copolymer, chlorotrifluoroethylene-vinylether copolymer, tetrafluoroethylene urethane crosslinked polymer, tetrafluoroethylene epoxy crosslinked polymer, tetrafluoroethylene acryl crosslinked polymer and tetrafluoroethylene melamine crosslinked polymer.

To assist the film integrity of the emulsion, it is preferable to add a solvent as a film integrity assistant. Concrete examples of film integrity assistants suitably used are: alcohols such as methyl alcohol, ethyl alcohol, propyl alcohol, butyl alcohol, hexyl alcohol, octyl alcohol and texanol; ethers such as cellosolve, ethyl cellosolve, butyl cellosolve, diethylene glycol monoethyl ether, diethylene glycol monobutyl ether, propylene glycol monoethyl ether, propylene glycol monoisobutyl ether, dipropylene glycol monobutyl ether, dipropylene glycol isobutyl ether, tripropylene glycol monoethyl ether, tripropylene glycol monobutyl ether and tripropylene glycol monoisobutyl ether; glycol ether esters such as butylcellosolve acetate, diethylene glycol monoethyl ether acetate, dipropylene glycol isobutyl ether acetate and tripropylene glycol monoisobutyl ether acetate.

From the viewpoint of alkali resistance or hardness, preferably the total sum of the solid matter in the silicone resin precursor composed of a water-based emulsion capable of forming a silicone resin film and/or the water-based emulsion capable of forming a fluorine resin constitutes more than 10% by weight and preferably 20% by weight or more of the total solid matter of the coating composition.

The use of a whisker, mica or talc as the component (b) is effective in preventing the occurrence of cracks when the coating film undergoes dry shrinkage or thermal shock and enhancing the adhesion of the coating film to be formed. Examples of whiskers include: titanium oxide whisker, calcium carbonate whisker, potassium titanate whisker and aluminum borate whisker. To obtain a crack-preventing effect, preferably the amount of the ingredient added is more than 5% by weight of the total solid matter of the coating composition and preferably 10% by weight or more. The amount is preferably 50% by weight or less. The reason is that if the amount is more than 50% by weight, the hardness and alkali resistance of the coating film to be formed deteriorate.

In whiskers, it is known that their aspect ratio (length: diameter ratio) has an effect on the prevention of cracks, and examples described later confirmed that cracks occurred a little in mica (in the form of a sheet), but not in whiskers, even when they were added in the same amount. Accordingly, of mica and whiskers, whiskers are preferable.

Examples of photocatalytic particles used as the ingredient (c) include: particles of titanium oxide, zinc oxide and tin oxide, but not limited to these ones, as long as they have photocatalytic activity. Photocatalytic particles with V, Fe, Co, Ni, Cu, Zn, Ru, Rh, Pd, Ag, Pt or Au, as a second component, carried inside themselves and/or on their surface are preferable, because they have improved photocatalytic activity.

Of the above photocatalytic particles, those of titanium oxide are preferably used because of their photocatalytic activity, chemical stability, safety, availability and low cost. Anatase type of titanium oxide is particularly preferably used because of its strong photocatalytic activity.

Photocatalytic particles can be used in the form of powder or sol. From the viewpoint of the hydrophilization rate, it is preferable that photocatalytic particles constitute more than 0.5% by weight of the total solid matter of the coating composition, preferably more than 20% by weight and more preferably 25% or more.

The primary particle size of titanium dioxide is preferably 1 to 100 nm. The primary particles less than 1 nm in size are not preferable because the dispersion of such fine particles is not stable and their secondary agglomeration is likely to occur, which may cause the deterioration of photocatalytic activity when forming a coating film. At the same time, the primary particles more than 100 nm in size are not preferable, either, because they may also cause the deterioration of photocatalytic activity when forming a coating film.

Examples of coloring pigments used as the ingredient (d) are classified into two broad types: inorganic and organic. However, when used in photocatalyst-containing coatings, inorganic coloring pigments are preferable because organic pigments are decomposed by photocatalytic action and discolored.

Examples of inorganic coloring pigments include: metal oxides such as titanium oxide white, titanium yellow, spinel green, zinc white, red iron oxide, chromium oxide, cobalt blue and black iron oxide; metal hydroxides such as alumina white and yellow oxide; ferrocyanides such as Prussian blue; lead chromates such as chrome yellow, zinc chromate and molybdate red; sulfides such as zinc sulfide, vermilion, cadmium yellow and cadmium red; selenides; sulfates such as barite and precipitated barium sulfate; carbonates such as ground calcium carbonate and precipitated calcium carbonate; silicates such as silicate hydrate, clay and ultramarine; carbons such as carbon black; metal powders such as aluminum powder, bronze powder and zinc powder; and pearl pigments such as titanated mica.

Silica particles can be mixed in the coating composition as an extender pigment that enhances the filling properties of the coating. Silica particles in the form of colloidal silica and silica aerosol are suitably used in this application.

As the solvent contained in the composition of this invention, (e) water is used.

Preferably, the thickness of the coating film obtained using the coating composition of this invention is 5 μm or more and preferably 10 μm or more.

In the coating composition of this invention, preferably the sum of the solid matter in the ingredients (a), (b) and (c) constitutes 10% by weight or more of the entire coating composition.

This makes it easy to pigment the coating film to be formed uniformly. Further, sags of the coating at the time of coating application become hard to occur.

In the coating composition of this invention, much preferably the sum of the solid matter in the ingredients (a), (b) and (c) constitutes more than 30% by weight of the entire coating composition. This makes it possible to obtain a sufficient film thickness only by one- or two-time roller coating without lapping the coating composition one over the other and obtain a coating film which exerts good weatherability.

In the coating composition of this invention, preferably the sum of the solid matter in the ingredients (a), (b) and (c) constitutes 60% by weight or less of the entire coating composition.

This provides sufficient can-stability.

Additives such as anti-settling agent, surfactant, anti-foaming agent, pH adjuster and thickening agent may be added to the coating composition of this invention, depending on the situation.

When intending to use the coating composition of this invention outdoors, where the coating's self-cleaning action with the aid of rainfall can be expected and the opaqueness of the coating film is not a problem, base materials to which the coating composition is applicable are, for example, metals, ceramics, plastics, wood, stone, cement, concrete, the combination thereof, the laminates thereof, and the things coated therewith. More specifically, applications of the coating composition of this invention include: for example, external facing of building such as exterior walls and roofs; external facing and coating of transportation means such as window frames, rolling stock, airplanes, shipping, bicycles, motorcycles; coating of sign boards, traffic signs, sound insulating walls, insulators, rain shutter doors, road lamps, pavements, outdoor lighting, artificial waterfalls, stones/tiles for artificial fountain, bridges, exterior wall materials, sealers between walls or glasses, guard rails, verandas, vending machines, outdoor units of air conditioners, outdoor benches, various kinds of displays, shutters, tollgates, fare boxes, gutters, equipment or articles; external facing and coating of ad pillars; structural members; and films or emblems that can be stuck to the above described articles.

In the following examples of self-cleaning water-based coating compositions in accordance with this invention will be described.

First, materials will be shown which constitute the coating compositions in accordance with this invention.

<Materials Constituting Coatings>

Potassium titanate whisker: HT300, by Otsuka Chemical Co., Ltd.

Talc: P3, by Nippon Talc Co., Ltd.

Inorganic coloring pigment: titanium oxide white, MF5760, by Dainichiseika Color and Chemical Mfg. Co., Ltd.

Photocatalytic particles: titanium oxide sol, STS-21, by ISHIHARA SANGYO Co., Ltd. with an average primer particle size of 10 m and a solid content of 38.4%

Silicone resin: silicone emulsion, BS45, by Wacker Chemicals East Asia, with a resin content of 50%

Fluorine resin: fluorine resin emulsion, Lumiflon FE4300, by Asahi Glass Co., Ltd., with a resin content of 48%

Colloidal silica: ST-50, by Nissan Chemicals Industries, Ltd., with a solid content of 48%

Solvent: water

Film integrity assistant: texanol, CS-12, by CHISSO CORPORATION

The materials shown above were mixed at ratios shown in examples and fully agitated so as to be used as coating compositions.

Colloidal silica was added as an extender pigment (filler).

<Method of Coating Specimen>

Acrylic organic sealer was spray coated onto slates having been cut to 150 mm×65 mm and dried at room temperature for 16 hours. The thickness of the acrylic sealer film was 40 to 50 μm. Then, the coating compositions shown in examples and comparative examples were spray coated directly onto the respective sealer-coated slates to produce coated slates. The thickness of each coating film was 40 to 50 μm. Heat drying was conducted depending on the situation.

In the following the effect of this invention on the performance of the coating film to be formed will be described taking several examples. The details are: 1. kind of solvent used for coating, 2. relationship between amount of whiskers and cracking, 3. relationship between pigment content and shielding properties, 4. relationship between amount of photocatalyst and rate of hydrophilization, 5. relationship between amount of silicone resin or fluorine resin and alkali resistance, and 6. occurrence of cracks when using mica. Evaluation methods used in each example and comparative example were as follows.

(Presence or Absence of Cracks)

The presence or absence of cracks was checked by observing the surface of each specimen visually and with an optical microscope. The optical microscope used was VK-8500, by KEYENCE Corporation and the observation was performed at ×1000 magnification.

(Accelerated Weathering Test)

Accelerated weathering test was conducted based on the accelerated weathering test using sunshine carbon arc in accordance with JIS K5400 9.8. After the test, the degree of cracking and chalking was checked. The degree of chalking was checked by sliding fingers softly on the coating film.

(Alkali Resistance)

Alkali-resistance test was performed in accordance with JIS K5400 8.21. The procedure for the test was as follows: pour 5% aqueous solution of sodium carbonate at 20±2° C. into a 300 ml beaker to a height of approximately 90 mm; dip each specimen in the aqueous solution while standing the same vertically; take the specimen out of the beaker after 24-hour dipping and subsequently wash its surface while pouring water softly; wipe the attached water lightly off the specimen and allow the specimen left stand at the test room for 3 hours; and check the presence of cracking, swelling and elution by softening on the surface of the specimen and compare the degree of haze and change in color caused in the dipped portion of the specimen with that of the non-dipped portion.

Quality Standard: The surface of the coating films has none of cracking, swelling, peeling and elution by softening after dipped in alkali and haze and change in color on their alkali-dipped portion are not serious, even when compared with those of the alkali-non-dipped portion.

(Tape Peeling Test)

Specimens having been subjected to alkali-resistance test was washed and dried at room temperature for 3 hours or more. Adhesive cellophane tape was put on each specimen and rubbed with an eraser so that the tape was completely stuck on its coating film. One to two minutes after the tape was stuck on the coating film, one end of the tape was picked and kept perpendicular to the coating film surface and the tape was torn off the coating film in an instance. When the films have tear resistance as high as that of the films before the alkali-resistance test, they were judged as G. When they have a little lower tear resistance than that of the films before the alkali-resistance test, they were judged as F. And when they have little tear resistance, they were judged as P.

(Hydrophilic Nature when Exposed to UV Rays)

Specimens having been subjected to drying at 180° C. for 20 minutes after their coating films were dried were exposed to UV light of 3 mW/cm$^2$ from a germicidal lamp so that the change in contact angle of water on their coating films was measured, and their hydrophilic nature was evaluated by the number of days it took to decrease the contact angle to 20' or less. At the same time, for specimens not having been subjected to heat drying, but located outdoors (with their coating surface facing southward and inclined at 45°) after their coatings were dried, their hydrophilic nature was also evaluated in the same manner as above. The contact angle was measured with CX-150 by Kyowa Interface Science Co., Ltd. after an elapse of 3 to 5 seconds after dropping a water droplet through the micro-syringe.

(Shielding Properties)

Slates coated with a black acrylic emulsion paint and coated with a white acrylic emulsion paint were prepared. The coating compositions of this invention were applied onto both the painted slates with rollers. The coating was repeated twice. The thickness of each coating film was 40 to 50 μm, just as the same as that of the specimens used in other evaluations. The difference in brightness was checked visually.

(Adhesion to Organic Painted Plates and Acrylic Plate)

The evaluation of the adhesion to organic painted plates and that of adhesion to an acrylic plate were performed separately. The test coatings were spray coated onto the respective test base materials. The thickness of the coating films was adjusted to 20 μM. The specimens were dried at room temperature for 14 days and then subjected to cross-cut adhesion test in accordance with JIS K5400 8.5. The organic painted plates used were prepared by applying an epoxy clear sealer coating onto slates, drying the sealer-coated slates at ordinary temperature for one day, and applying a fluorine coating (Bonflon, by Asahi Glass Coat & Resin, Co., Ltd.), an urethane coating (Wideurethane, by Suzukafine Co., Ltd.), a silicone-acrylic coating (Neosilica, by Isamu Paint Co., Ltd.) or an acrylic emulsion coating (AEP Modern, by Suzukafine Co., Ltd.), as face coating, onto the respective sealer-coated slates at ordinary temperature.

In the following examples and comparative examples will be describes in detail.

Comparative Example 6

Photocatalytic powder (STS-21, by ISHIHARA SANGYO Co., Ltd.), tetramethoxysilane (tetrafunctional silane), a potassium titanate whisker (HT300, by Otsuka Chemical Co., Ltd.), a pigment, a hardening catalyst, colloidal silica (ST-50, by Nissan Chemicals Industries, Ltd., with a solid content of 48%), and isopropyl alcohol were mixed at the solid matter ratio shown in Table 7 and fully agitated to produce a coating composition #14. The coating composition #14 was applied onto the slate in accordance with the above described <Method of Coating Specimen> to produce a specimen #14s.

Immediately after the application of the coating compositions the specimens #12s, #13s and #14s were located outdoors and exposed for one week. At the same time, specimens prepared in the same manner as above were cured at room temperature for 14 days and subjected to accelerated weathering test for 600 hours.

In the specimens #12s, #13s having been exposed outdoors, no cracks were observed even under the microscope, whereas in the specimen #14s having been exposed outdoors, many cracks were observed visually. In the specimens #12s, #13s having been subjected to accelerated weathering test (600 hours), cracks were observed only under the microscope, but no chalking was observed, whereas in the specimen #14s having been subjected to accelerated weathering test (600 hours), a great many cracks were observed visually and significant chalking was confirmed on the surface of the coating film.

The outdoor exposure and accelerated weathering test confirmed that the coating compositions of this invention, which use water as the solvent and a water-soluble resin, do not attack the organic film of a primer, unlike solvent base silicone resin coatings, and have such weathering performance that causes neither cracking nor chalking even when applied directly onto an organic coating film.

TABLE 7

| Specimen | Titanium oxide | Silicone resin | Fluorine resin | Talc | Whisker | Pigment | Silica | Catalyst | Kind of Solvent Solvent | Appearance Outdoor exposure | Appearance SWOM |
|---|---|---|---|---|---|---|---|---|---|---|---|
| #12s | 25 | 1 | — | — | 17 | 23 | 14 | 0 | water | G | G |
| #13s | 1 | — | 23 | 11 | 5 | 21 | 39 | 0 | water | G | F |
| #14s | 24.5 | 21 | — | — | 17 | 23 | 14 | 0.5 | IPA | P | P |

In Table 7, silica means colloidal silica. The same is true for silica in the other tables.
Crack index: G indicates no cracks, F cracks observed under the microscope, and P cracks observed visually. The same is true for the index in the other tables.

1. Effect of Kind of Solvent Used

Example 16

Photocatalytic particles, a water-based silicone emulsion, a whisker, a pigment, colloidal silica and water were mixed at the solid matter ratio shown in Table 7 and fully agitated to produce a coating composition #12. Then, photocatalytic particles, a water-based fluorine resin emulsion, a whisker, talc, a pigment, colloidal silica and water were mixed at the ratio shown in Table 7 and fully agitated to produce a coating composition #13.

The solid content was adjusted to 40% by weight. The coating compositions #12, #13 were applied onto the respective slates in accordance with the above described <Method of Coating Specimen> to produce specimens #12s, #13s.

Relationship Between Presence of Whisker, Talc and Cracking

Example 17

Coating compositions #15, #16 were prepared based on the solid matter content ratio shown in Table 8 and specimens #15s, #16s were produced using the coating compositions.

Comparative Example 7

A Coating composition #17 was prepared using the same ingredients as in example 17, except that no whisker was used and a specimen #17s was produced using the coating composition #17.

Immediately after the application of the coating compositions the specimens #15s, #16s and #17s were located outdoors and exposed for one week to observe the occurrence of cracking.

In the specimens #15s, #16s, films were obtained in which no cracks were caused, whereas in the specimen #17s, many cracks were observed in the film even visually.

TABLE 8

Relationship between Presence of whisker, talc and cracking

| Specimen | Titanium oxide | Silicone resin | Fluorine resin | Talc | Whisker | Pigment | Silica | Solvent | Appearance Outdoor exposure |
|---|---|---|---|---|---|---|---|---|---|
| #15s | 25 | 21 | — | — | 17 | 23 | 14 | water | G |
| #16s | 1 | — | 23 | 11 | 5 | 21 | 39 | water | G |
| #17s | 30 | 25 | — | — | 0 | 28 | 17 | water | P |

Relationship Between Amount of Whisker and Cracking

Example 18

Just like in example 16, the ingredients were mixed at the solid matter ratio shown in Table 9 and fully agitated to produce coating compositions #18, #19. And specimens #18s, #19s were produced using the coating compositions #18, #19.

Immediately after the application of the coating compositions the specimens #18s and #19s were located outdoors and exposed for one week to observe the occurrence of cracking.

In the specimens #18s, a film was obtained in which no cracks were observed even under the microscope, whereas in the specimen #19s, many cracks were observed in the film with an optical microscope at ×1000 magnification.

This confirmed that to prevent the occurrence of cracking, the coating composition of this invention is required to have a content of 5% or more whisker.

TABLE 9

Amount of whisker and cracking

| Specimen | Titanium oxide | Silicone resin | Whisker | Pigment | Silica | Solvent | Appearance |
|---|---|---|---|---|---|---|---|
| #18s | 25 | 21 | 17 | 23 | 14 | water | G |
| #19s | 25 | 24 | 5 | 28 | 118 | water | F |

Relationship Between Pigment Content and Shielding Properties

Example 19

Just like in example 16, the ingredients were mixed at the solid matter ratio shown in Table 10 and coating compositions #20, #21 were produced. Black steel plates and white steel plates were prepared and the coating compositions #20, #21 were applied onto the respective steel plates to check the shielding properties of the coating film to be formed. In the coating film of the specimen #20s, the shielding properties were satisfactory, whereas in the coating film of the specimen #21s, the shielding properties were not sufficient and the difference in brightness between the coating film on the white steel plate and that on the black steel plate was observed visually.

This confirmed that to allow a coating film to have sufficient shielding properties, the coating composition of this invention is required to have a content of 10% or more and preferably 20% or more inorganic coloring pigment.

TABLE 10

Pigment and shielding properties

| Specimen | Titanium oxide | Silicone resin | Whisker | Pigment | Silica | Solvent | Shielding |
|---|---|---|---|---|---|---|---|
| #20s | 25 | 21 | 17 | 23 | 14 | water | G |
| #21s | 32 | 27 | 21 | 10 | 10 | water | P |

Relationship Between Amount of Photocatalyst and Rate of Hydrophilization

Example 20

Just like in example 16, coating compositions #22, #23 and #24 were prepared based on Table 11 and specimens #22s, #23s and #24s were produced by applying the above coating compositions onto the respective base materials. The specimens were heat dried in accordance with the above described test method (180° C./20 minutes) and exposed to light from germicidal lamp. The light exposure was continued until the contact angle of water on each coating film was decreased to 20° or less, while measuring the contact angle every other day. At the same time, the specimens having been produced in the same way as above and not dry heated were located outdoors, and their outdoor exposure was continued until the contact angle of water on each coating film was decreased to 20° or less.

As shown in Table 11, the number of days it took to decrease the contact angle to 20° or less by the light irradiation with a germicidal lamp was 2 for the specimens #22s, #23s and 3 for the specimen #24. And the number of days it took to decrease the contact angle to 20° or less by the outdoor exposure was 45 for the specimens #22s and 60 for the specimens #23s and #24s.

This confirmed that the coating composition of this invention provide a coating film with hydrophilic nature on which the contact angle of water can be decreased to 20° or less, even if it has a content of titanium oxide as little as 1%.

This confirmed that to maintain the alkali resistance of the coating films to be formed, the coating composition of this invention is required to have a content of 10% or more and preferably 20% or more silicone resin and/or fluorine resin.

TABLE 11

Amount of photocatalyst and rate of hydrophilization

| Specimen | Titanium oxide | Silicone | Fluorine resin | Talc | Whisker | Pigment | Silica | Solvent | Outdoor exposure Contact angle of 20° | Germicidal Lamp Contact angle of 20° |
|---|---|---|---|---|---|---|---|---|---|---|
| #22S | 25 | 25 | — | — | 15 | 25 | 10 | water | 45 days | 2 days |
| #23S | 20 | 27 | — | — | 16 | 26 | 11 | water | 60 days | 2 days |
| #24S | 1 | — | 15 | 10 | 10 | 25 | 39 | water | 60 days | 3 days |

Relationship Between Amounts of Silicone Resin and Fluorine Resin and Alkali Resistance Example 21

Just like in example 16, coating compositions #25, #26 and #27 were prepared based on Table 12 and specimens #25s, #26s and #27s were produced. After the application of the respective coating compositions, the specimens were cured indoors for 7 days and dipped in a 5% aqueous solution of sodium carbonate for 24 hours in accordance with JIS A5400, as aforementioned. The appearance observation confirmed that none of cracking, swelling, peeling and elution by softening occurred in the coating films of the specimens #25s, #26s and #27s. The color became a little white in the portion dipped in the solution, compared with the non-dipped portion, but the difference is not significant.

The specimens having been dipped in the alkali solution were dried and then subjected to tape peeling test. The films of the specimens #25s and #26s had tear resistance as high as that of the films before dipped in the solution (evaluation: G), whereas the film of the specimen #27s had a little lower tear resistance than that of the film before dipped in the solution (evaluation: F).

TABLE 12

Amounts of silicone resin, fluorine resin and alkali resistance

| Specimen | Titanium oxide | Silicone | Fluorine resin | Talc | Whisker | Pigment | Silica | Solvent | Appearance |
|---|---|---|---|---|---|---|---|---|---|
| #25S | 25 | 25 | — | — | 15 | 25 | 10 | water | tape peeling test G |
| #26S | 1 | — | 24 | 10 | 5 | 21 | 39 | water | tape peeling test G |
| #27S | 29 | 10 | — | — | 20 | 26 | 15 | water | tape peeling test F |

Cracking when Mica is Used

Example 22

Just like in example 16, a coating composition #28, which included a whisker, and coating compositions #29 and #30, which included mica instead of a whisker, were prepared based on Table 13 and specimens #28s, #29s and #30s were produced. After the application of the respective coating compositions, the specimens were exposed outdoors for 7 days.

In the specimen #28s, whose film had a content of 15% by weight potassium titanate whisker, no cracks were observed in the film even under the microscope. In the specimens #29s and #30s, whose films had a content of 15% by weight mica, cracks were observed under the microscope after drying, though the number was small.

TABLE 13

Cracking when mica is used

| Specimen | Titanium oxide | Silicone | Mica | Whisker | Pigment | Silica | Solvent | Appearance |
|---|---|---|---|---|---|---|---|---|
| #28s | 30 | 25 | — | 15 | 20 | 10 | water | G |
| #29s | 30 | 25 | 15 *1 | 0 | 20 | 10 | water | G |
| #30s | 30 | 25 | 15 *2 | 0 | 20 | 10 | water | F |

*1: particle size of mica 25 μm,
*2: particle size of mica 50 μm

Relationship of Solid Content in Coating and Film Thickness

Example 23

Coating compositions #31, #32, #33 and #34 were prepared by adjusting the solid content in the coating compositions having the same formulation as that of the coating composition #12 shown in Table 7 to 10, 20, 30 and 40% by weight, respectively. And specimens #31s, #32s, #33s and #34s were produced using the resultant coating compositions. The first roller coating was performed on an aluminum plate. After 3 hours, the second roller coating was performed. Two-time wet-on-wet coating with a roller is a common specification of coloring facing materials. After dried at 80° C./30 minutes, the thickness of each coating film was measured with an electromagnetic-type coating thickness tester, Isoscope MP 30, by Kett Electric Laboratory. The measurements of film thickness are shown in Table 14.

Comparative Example 8

A coating composition (#35) was prepared by adjusting the solid content in the coating composition having the same formulation as that of the coating composition #12 shown in Table 7 to 5% by weight. The first roller coating was performed on an aluminum plate. After 3 hours, the second roller coating was performed. After dried at 80° C./30 minutes, the thickness of the coating film was measured with an electromagnetic-type coating thickness tester.

The coating compositions having a solid content of 10% or more provide coating films 10 μm or more. Such films have a UV light transmission rate of approximately 1% and produce a sufficient UV light shielding effect. On the other hand, the coating compositions having a solid content of less than 5% provide coating films having a UV light transmission rate of several ten %. This causes a fear that the photocatalytic layer attacks the substrate or the coating film deteriorates due to UV light itself.

Accordingly, it is preferable to adjust the solid content to 10% or more that allows a coating film to have a sufficient thickness even by ordinary coating method. This example confirmed that the solid content of 30% or more increases the viscosity of coating compositions (150 cps or more) and prevents sags of the coating at the time of roller coating. The viscosity was measured with a B-type rotary viscometer at room temperature of 20° C.

TABLE 14

Relationship of film thickness and solid content in coating

| | Solid content in coating | | | | |
|---|---|---|---|---|---|
| | 5% (#35) | 10% (#31) | 20% (#32) | 30% (#33) | 40% (#34) |
| Average film thickness (μm) | 3.5 | 11.1 | 24.7 | 33.3 | 45.6 |
| Viscosity (cps) | less than 20 | less than 20 | 30 | 150 | 500 |

Adhesion to Organic Painted Plates and Acrylic Plate

Adhesion to organic painted plates and acrylic plate was tested using a coating composition prepared based on the coating composition #13 shown in Table 7. The solid content in the coating composition used for the test was adjusted to 40% by weight. The test results are shown in Table 15.

TABLE 15

Adhesion to organic painted plates and acrylic plate

| | Kind of facing materials of organic painted plates | | | | |
|---|---|---|---|---|---|
| | Fluorine coating | Urethane coating | Silicone-acrylic coating | Acrylic coating | Acrylic plate |
| Coating composition #13 | 100/100 | 100/100 | 100/100 | 100/100 | 100/100 |

The test results confirmed that the coating composition of this invention provides sufficient adhesion to organic painted plates and an acrylic plate even if a primer is not used between the coating composition and the plates.

INDUSTRIAL APPLICABILITY

As described so far, according to this invention, stainproofing effects and hydrophilic nature of coating films are produced by the addition of a photocatalyst to coating compositions that are to form the coating films. Further, water-based coating compositions can be obtained which provide coating films capable of preventing the occurrence of cracking and excellent in peel strength even when the films are formed on organic base materials and their thickness is increased.

According to this invention, coating members having good adhesion to organic grounds and excellent durability can be obtained by using, as a binder component, a silicone resin precursor composed of a water-based emulsion capable of forming a silicone resin coating film and/or a water-based emulsion capable of forming a fluorine resin and/or colloidal silica in coating compositions that exert self-cleaning properties in the presence of photocatalytic particles or sol and by setting the content of the photocatalyst in the solid matter of the coating to less than 5% by weight. The durability of the coating members can be further improved by the addition of an inorganic coloring pigment and an inorganic extender pigment.

Further, according to this invention, the formation of coating films several μm to several ten 11m thick, which coating compositions for exterior walls are required to form, and the prevention of cracking in coating films can be realized at the same time by allowing coating compositions that exert self-cleaning properties in the presence of photocatalytic particles or sol to include a silicone resin precursor composed of a water-based emulsion capable of forming a silicone resin coating film and/or a water-based emulsion capable of forming a fluorine resin and whisker. Coating films having sufficient thickness to shield UV rays can also have good adhesion to organic grounds.

Although there have been described what are the present embodiments of the invention, it will be understood that variations and modifications may be made thereto within the scope of the claims appended hereto.

The invention claimed is:

1. A method of producing a photocatalytic composite, comprising the steps of:
    coating the surface of a base material having hydrophobic substances on its surface with a photocatalytic coating material including at least (a) photocatalytic oxide particles, (b) emulsified particles of hydrophobic-resin, (c) water, and (d) silica particles; and
    hardening the coated material at ordinary temperature;
    wherein the average particle sizes of the ingredient (a) and the ingredient (d) are smaller than that of the ingredient (b),
    ingredient (a) constitutes 1 to less than 5% by weight of the total solid matter of the coating material,
    ingredient (d) constitutes a total solid matter of the coating material in a range of 2.7%<(d)≦90% by weight, and
    a sum of the solid matter in the ingredients (a), (b), and (d) constitutes more than 30% by weight to less than 60% by weight of the entire coating composition.

2. The method of producing a photocatalytic composite according to claim 1, wherein the average particle size of the ingredient (a) is 5 to 50 nm, the average particle size of the ingredient (d) is 5 to 100 nm, and the average particle size of the emulsified particles of the hydrophobic resin dispersed in the ingredient (b) is 80 to 300 nm.

3. The method of producing a photocatalytic composite according to claim 1, wherein the ingredient (b) constitutes 5 to 98% by weight of the total solid matter of the coating material, and the amount of the ingredient (c) blended is 10 to 500 parts by weight per 100 parts of the solid matter.

4. The method of producing a photocatalytic composite according to claim 1, wherein the ingredient (b) is one or more selected from the group consisting of a fluorine-resin emulsion and a silicone emulsion.

5. The method of producing a photocatalytic composite according to claim 1, wherein the coating material forms a coating film 1 μm to 1 mm thick on the surface of the base material.

6. The method of producing a photocatalytic composite according to claim 1, wherein the ingredient (a) and the ingredient (d) move upward when the coating material is coated on the surface of the base material.

7. The method of producing a photocatalytic composite according to claim 1, wherein the ingredient (b) moves downward when the coating material is coated on the surface of the base material.

8. A photocatalytic coating material, which hardens at ordinary temperature after the photocatalytic coating material has been coated on a surface of a base material, comprising:
    at least (a) photocatalytic oxide particles, (b) emulsified particles of hydrophobic-resin, (c) water, and (d) silica particles; wherein
    the ingredient (a) constitutes 1 to less than 5% by weight of the total solid matter of the coating material,
    the ingredient (d) constitutes a total solid matter of the coating material in a range of 2.7%<(d)≦90% by weight,
    average particle sizes of the ingredient (a) and the ingredient (d) are smaller than that of the ingredient (b), and
    a sum of the solid matter in the ingredients (a), (b), and (d) constitutes more than 30% by weight to less than 60% by weight of the entire coating composition.

9. The photocatalytic coating material according to claim 8, wherein the ingredient (a) and the ingredient (d) move upward when the coating material is coated on the surface of the base material.

10. The photocatalytic coating material according to claim 8, wherein the ingredient (b) moves downward when the coating material is coated on the surface of the base material.

11. The photocatalytic coating material according to claim 8, wherein the coating material forms a coating film 1 μm to 1 mm thick on when coated on the surface of the base material.

12. The method of producing a photocatalytic composite according to claim 1, wherein the average particle size of the ingredient (a) is 5 to 50 nm, the average particle size of the ingredient (d) is 5 to 100 nm, and the average particle size of emulsified particles of the hydrophobic resin dispersed in the ingredient (b) is 80 to 300 nm.

13. The photocatalytic coating material according to claim 8, wherein the ingredient (b) constitutes 5 to 98% by weight of the total solid matter of the coating material, and the amount of the ingredient (c) blended is 10 to 500 parts by weight per 100 parts of the solid matter.

14. The photocatalytic coating material according to claim 8, wherein the ingredient (b) is one or more selected from the group consisting of a fluorine-resin emulsion and a silicone emulsion.

15. The method of producing a photocatalytic composite according to claim 1, wherein the silica particles are colloidal silica.

16. The photocatalytic coating material according to claim 8, wherein the silica particles are colloidal silica.

17. The method of producing a photocatalytic composite according to claim 6, wherein the ingredient (a) and the ingredient (d) move upward separately from each other.

18. The photocatalytic coating material according to claim 9, wherein the ingredient (a) and the ingredient (d) move upward separately from each other.

* * * * *